(12) United States Patent  
Morishige et al.

(10) Patent No.: US 8,149,675 B2  
(45) Date of Patent: Apr. 3, 2012

(54) RECORDING APPARATUS, RECORDING METHOD, PROGRAM, AND RECORDING MEDIUM

(75) Inventors: Yusaku Morishige, Kanagawa (JP); Nobuhiko Ando, Tokyo (JP)

(73) Assignee: Sony Corporation (JP)

( * ) Notice: Subject to any disclaimer, the term of this patent is extended or adjusted under 35 U.S.C. 154(b) by 310 days.

(21) Appl. No.: 11/919,625

(22) PCT Filed: Apr. 27, 2006

(86) PCT No.: PCT/JP2006/308845  
§ 371 (c)(1),  
(2), (4) Date: Nov. 4, 2009

(87) PCT Pub. No.: WO2006/120918  
PCT Pub. Date: Nov. 16, 2006

(65) Prior Publication Data  
US 2010/0046337 A1    Feb. 25, 2010

(30) Foreign Application Priority Data  
May 6, 2005    (JP) .................. 2005-134717

(51) Int. Cl.  
*G11B 7/00*    (2006.01)

(52) U.S. Cl. .................. 369/59.25; 369/53.24; 369/94

(58) Field of Classification Search .................. None  
See application file for complete search history.

(56) References Cited

U.S. PATENT DOCUMENTS 7,623,432 B2 * 11/2009 Koppers et al. .................. 369/94  
7,725,004 B2 * 5/2010 Ohishi .......................... 386/343

(Continued)

FOREIGN PATENT DOCUMENTS  
EP        1291865        3/2003  
(Continued)

OTHER PUBLICATIONS

Optical Storage Technology Association (OSTA): "Universal Disk Format Specification, OSTA-2, Revision 2.00" Internet Citation, [Online] Retrieved from the Internet: <URL:WWW.OSTA.ORG>>.

(Continued)

*Primary Examiner* — Lixi C Simpson  
(74) *Attorney, Agent, or Firm* — Lerner, David, Littenberg, Krumholz & Mentlik, LLP

(57) ABSTRACT

The present invention relates to a recording apparatus, a recording method, a program, and a recording medium whereby data is reproduced from a two-layer optical disk that has yet to be formatted completely. A control section 51 divides a recording area of a layer L0 of the optical disk 33 into a plurality of recording regions and a recording area of a layer L1 of the same disk 33 into a plurality of recording regions at substantially the same physical positions as the recording regions of the layer L0. A control section 51 records the region where user-designated data was last written. The control section 51 controls a signal processing section 56 to write dummy data to the recording area of the layer L0 or L1 different from the layer that includes the region to which the user-designated data was last written. The signal processing section 56 is then controlled to write dummy data to the recording area of the layer containing the region where the user-designated data was last written, thus formatting the optical disk 33. This invention can be applied advantageously to the recording apparatus for recording data to optical disks.

5 Claims, 17 Drawing Sheets

U.S. PATENT DOCUMENTS

| | | | |
|---|---|---|---|
| 2003/0210627 A1* | 11/2003 | Ijtsma et al. | 369/53.18 |
| 2005/0030852 A1 | 2/2005 | Sasaki | |
| 2005/0207292 A1* | 9/2005 | Hung | 369/47.5 |
| 2006/0198265 A1* | 9/2006 | Sasaki | 369/53.24 |
| 2006/0233079 A1* | 10/2006 | Teranishi | 369/53.24 |

FOREIGN PATENT DOCUMENTS

| | | |
|---|---|---|
| EP | 1492117 | 12/2004 |
| JP | 11-134799 A | 5/1999 |
| JP | 2003-168266 A | 6/2003 |
| JP | 11-3474110 A | 9/2003 |
| JP | 2003-296040 A | 10/2003 |
| JP | 2005-093032 A | 4/2005 |
| JP | 2006-031740 A | 2/2006 |
| WO | 03/046916 | 6/2003 |
| WO | 2005124781 A2 | 12/2005 |

OTHER PUBLICATIONS

Supplementary European Search Report, EP 06 74 5773.

Optical Storage Technology Association (OSTA): "Universal Disk Format Specification, OSTA-2, Revision 2.00" Internet Citation, [Online] Retrieved from the Internet: <URL:WWW.OSTA.ORG>>, Apr. 3, 1998.

Supplementary European Search Report, EP 06 74 5773, Dec. 10, 2008.

Communication from EP Application No. 06745773, dated Oct. 13, 2011.

* cited by examiner

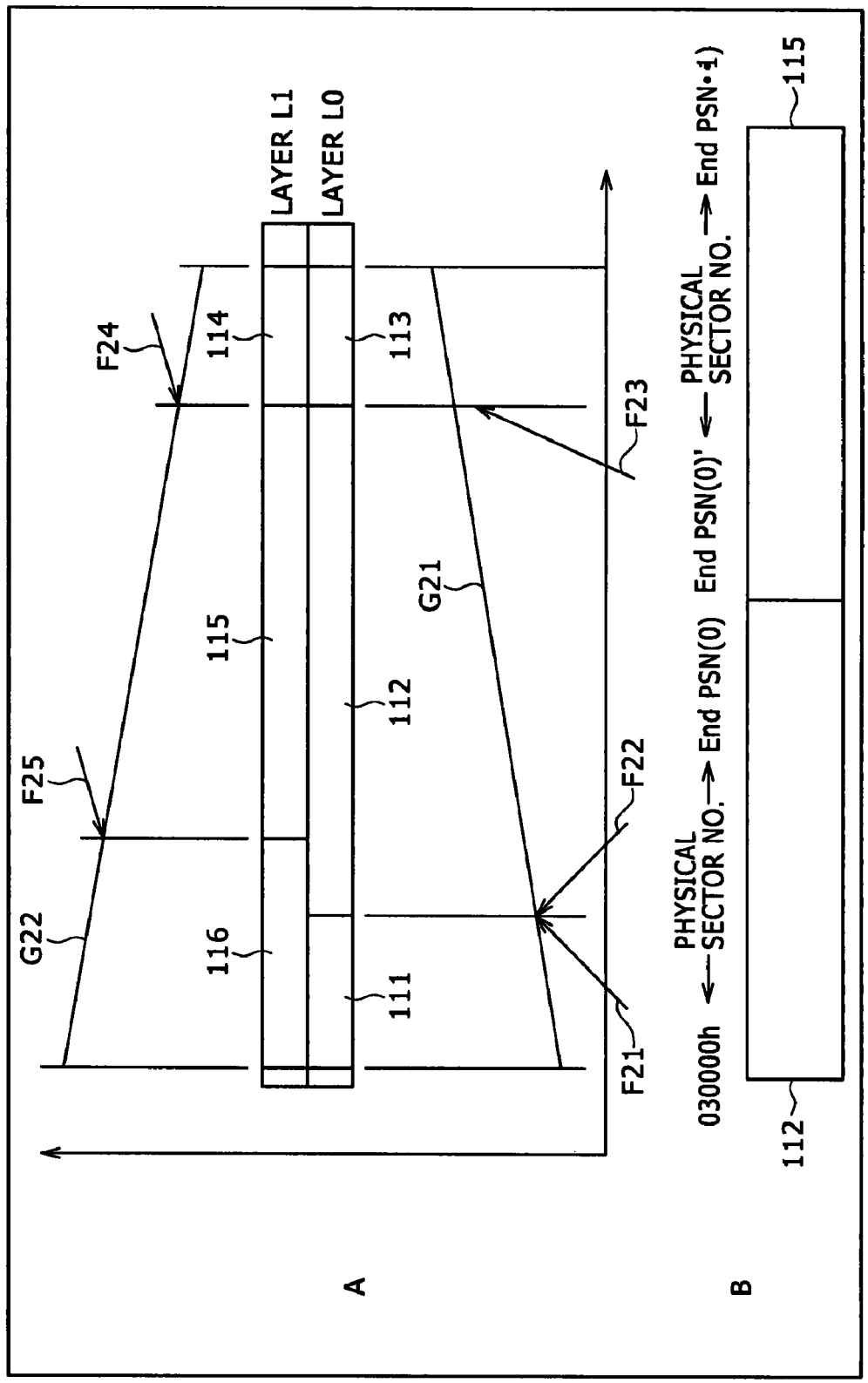

FIG. 5

| PHYSICAL SECTOR OF ECC BLOCK | MAIN DATA BYTE POSITION | DESCRIPTION | NUMBER OF BYTES |
|---|---|---|---|
| 0 | $D_0$ TO $D_3$ | CONTENT DESCRIPTOR | 4 |
| 0 | $D_4$ TO $D_7$ | UNKNOWN CONTENT DESCRIPTOR ACTIONS | 4 |
| 0 | $D_8$ TO $D_{39}$ | DRIVE ID | 32 |
| 0 | $D_{40}$ TO $D_{43}$ | FDCB UPDATE COUNT | 4 |
| 0 | $D_{44}$ TO $D_{47}$ | FORMATTING STATUS AND MODE | 4 |
| 0 | $D_{48}$ TO $D_{51}$ | LAST WRITTEN ADDRESS | 4 |
| 0 | $D_{52}$ TO $D_{55}$ | LAST VERIFIED ADDRESS | 4 |
| 0 | $D_{56}$ TO $D_{59}$ | BITMAP START ADDRESS | 4 |
| 0 | $D_{60}$ TO $D_{63}$ | BITMAP LENGTH | 4 |
| 0 | $D_{64}$ TO $D_{95}$ | DISK ID | 32 |
| 0 | $D_{96}$ TO $D_{127}$ | APPLICATION DEPENDENT | 32 |
| 0 | $D_{128}$ TO $D_{191}$ | LIST OF DCBs | 16×4 |
| 0 | $D_{192}$ TO $D_{2\,047}$ | RESERVED AND SET TO (00) | 1 856 |
| 1 TO 9 | $D_0$ TO $D_{2\,047}$ | FORMATTING BITMAP | 9×2 048 |
| 10 TO 15 | $D_0$ TO $D_{2\,047}$ | RESERVED AND SET TO (00) | 6×2 048 |

FIG.14

| REGION Rx | LAST WRITTEN ADDRESS |
|---|---|
| REGION R0 | LAYER L0, 3000 |
| REGION R1 | LAYER L0, 5000 |
| REGION R2 | LAYER L0, 6000 |
| ⋮ | ⋮ |

RECORDING APPARATUS, RECORDING METHOD, PROGRAM, AND RECORDING MEDIUM

CROSS REFERENCE TO RELATED APPLICATIONS

The present application is a national phase entry under 35 U.S.C. §371 of International Application No. PCT/JP2006/308845 filed Apr. 27, 2006, published on Nov. 16, 2006 as WO 2006/120918 A1, which claims priority from Japanese Patent Application No. JP 2005-134717 filed in the Japanese Patent Office on May 6, 2005.

TECHNICAL FIELD

The present invention relates to a recording apparatus, a recording method, a program, and a recording medium. More specifically, the invention relates to a recording apparatus, a recording method, a program, and a recording medium whereby data is recorded to optical disks.

BACKGROUND ART

Recent years have witnessed optical disks such as CD-RW (Compact Disk Rewritable) and DVD+RW (Digital Versatile Disk Rewritable) being used extensively as rewritable recording media. With large numbers of these rewritable recording media in circulation, the need exists for better compatibility between recording apparatuses for writing data to these disks on the one hand, and reproducing apparatuses, especially those with no means to record data to such disks on the other hand. For the sake of convenience, it is preferred that data be reproduced from rewritable optical disks also by the reproducing apparatus incapable of wring data to such disks.

Optical disks such as CD-RW and DVD+RW to and from which data can be written and read randomly come in one of two states: either they have no data recorded in their recording regions, or they have both data-filled and data-free regions located side by side on a single disk.

When there is no data recorded in the recording regions of an optical disk, the recording and reproducing apparatus with means to write data can extract synchronization information for determining the physical addresses of the recording regions out of an acquired wobble signal. The wobble signal is obtained (i.e., detected) by emitting a light beam (laser) to a slightly meandering track of the recording regions.

Where there is data recorded in the recording regions of an optical disk, the recording and reproducing apparatus acquires a reproduced signal from the disk by emitting the light beam to the pits formed in these regions. From the reproduced signal thus obtained, the recording and reproducing apparatus can extract (i.e., acquire) synchronization information for determining the physical addresses of the recording regions together with the data which was retrieved from the recording regions and which contains the synchronization information.

The reproducing apparatus with no means to write data, by contrast, works on the assumption that data is reproduced from a data-filled optical disk, i.e., from an optical disk with no data-free recording regions. The reproducing apparatus can extract from the reproduced signal the synchronization information for determining the physical addresses of the recording regions. Unlike the recording and reproducing apparatus, however, the reproducing apparatus has no facility for extracting the synchronization information from the above-mentioned wobble signal.

That is, the reproducing apparatus is incapable of reproducing data from optical disks with no data-filled recording regions or from optical disks each containing both data-filled and data-free regions. The reason is that from any data-free recording region on the optical disk, the reproducing apparatus cannot extract (obtain) data synchronization information.

The recording and reproducing apparatus thus needs to format the entire optical disk so that the reproducing apparatus may randomly reproduce the data recorded randomly on the optical disk. The formatting involves writing dummy data to the whole recording regions of each optical disk.

Illustratively, if a data-free optical disk (i.e., blank or virgin disk) is mounted on the recording and reproducing apparatus, the apparatus formats the disk by writing dummy data to the whole recording regions of the mounted disk. It takes a lot of time for the recording and reproducing apparatus to format all recording regions of the mounted optical disk. An extended period of time typically elapses before the formatting is completed and the optical disk is ready to be used by the user. In other words, following the mounting of an optical disk (blank disk) on the recording and reproducing apparatus, the user must wait a long time for the disk to be completely formatted for use.

It is obvious that after mounting an optical disk on the recording and reproducing apparatus, the user expects to have the disk readied for use in the shortest possible time.

Some techniques have been proposed to bypass the above difficulty. The techniques involve first completing initialization of (i.e., writing of necessary data to) the lead-in area of a rewritable single-layer optical disk, the area accommodating information about the data to be recorded to the recording regions of the optical disk. With the lead-in area initialized, a host device such as a personal computer connected to the recording and reproducing apparatus is allowed to access the mounted optical disk. Thereafter, while the recording and reproducing apparatus is at rest (in idle state), dummy data is written to data-free regions (i.e., unrecorded regions) in the user area to which to write the data designated by the connected host device (i.e., user) in what is known as a background formatting process (See Patent Document 1).

Patent Document 1

Japanese Patent Laid-open No. Hei 11-134799.

DISCLOSURE OF THE INVENTION

Problems to be Solved by the Invention

Suppose that during formatting of the single-layer optical disk by a recording apparatus, the user gives an instruction to unmount the optical disk from the recording apparatus. At that moment, the recording apparatus writes dummy data to any region free of data or dummy data in the area ranging from the beginning of the user area located in the radially innermost zone of the optical disk, to the radially outermost position where data is written in the user area (i.e., farthest position from the beginning of the user area). The recording apparatus then writes a temporary lead-out (TLO) area indicating the ending position of the data-filled regions in the user area away from the radially outermost position of the data written in the user area, before ejecting the optical disk. In other words, the recording apparatus records data or dummy data starting from the lead-in area to the radially outermost position of the data written in the user area, creates the temporary lead-out area, and then ejects the optical disk.

Meanwhile, during formatting of a two-layer optical disk by a recording apparatus, the user might give an instruction to unmount the disk from the apparatus. In that case, the recording apparatus writes data or dummy data to each of the layers, creates a lead-out area (or a temporary middle area, to be described later) per layer, and then ejects the optical disk.

If the rewritable two-layer optical disk is to be unmounted halfway through the formatting by the recording and reproducing apparatus operating with traditional techniques, it might happen that data (or dummy data) has been recorded to the recording regions of one of the layers but has yet to be recorded to the recording regions in the corresponding positions of the other layer. This eventuality makes it difficult to apply the above-outlined background formatting process to the formatting of the rewritable two-layer optical disk.

For example, consider a two-layer optical disk, as seen in FIG. 1, with its left-hand side recording regions located on the radially inner side and its right-hand recording regions on the radially outer side. The recording layer closer to the optical pickup emitting the light beam to the disk surface is called the layer L0. Suppose now that a region 11 in the layer L0 has data recorded therein and that a region 12 in the other layer called the layer L1 (different from the layer L0 and farther from the optical pickup) also has data recorded therein.

In FIG. 1, an arrow A1 indicates a particular position (position A1) of the data-filled region 11 in the layer L0. An arrow A2 indicates a specific position (position A2) of a data-free region 14 (devoid of data or dummy data) in the layer L1. An arrow B1 indicates a particular position (position B1) of the data-filled region 12 in the layer L1.

In FIG. 1, a region 13 is a data-free region (devoid of data or dummy data) in the layer L0, and the region 14 is a similarly data-free region in the layer L1.

Suppose that a reproducing apparatus about to reproduce data from the optical disk of the above structure performs a seek from the position A1 in the layer L0 to the position B1 in the layer L1. The seek may typically involve executing a cross-layer jump from the position A1 in the layer L0 to the position A2 in the layer L1 and then carrying out an optical pickup movement from the position A2 to the position B1 in the layer L1.

However, because the region 14 containing the position A2 has no data or dummy data recorded therein, the reproducing apparatus in the position A2 of the layer L1 cannot acquire data synchronization information for determining the physical addresses of the recording regions in the layer L1. Incapable of determining the position in the region 14 of the layer L1, the reproducing apparatus cannot move its optical pickup from the position A2 to the position B1.

In the two-layer optical disk setup, as described above, the reproducing apparatus may not be able to reproduce data from the disk that was formatted earlier by a recording apparatus. Because the two-layer optical disk has more recording regions to be formatted than the single-layer optical disk, it takes longer to finish the formatting process. If the user issues an instruction to unmount (i.e., eject) the optical disk halfway through the formatting, an inordinately prolonged time period may have to elapse from the time the instruction is given until the optical disk is ejected from the recording apparatus.

The present invention has been made in view of the above circumstances and provides arrangements enabling the reproducing apparatus with no data writing means to reproduce data from a two-layer optical disk that has yet to be formatted completely.

Means for Solving the Problems

In carrying out the present invention and according to one embodiment thereof, there is provided a recording apparatus including: division management means for dividing for management purposes a recording area of a first recording layer of the data recording medium into a plurality of first recording regions and a recording area of a second recording layer of the same medium into a plurality of second recording regions at substantially the same physical positions as the first recording regions; and recording control means for controlling data recording to the data recording medium in such a manner that if one of the first regions targeted to be written with first data for formatting or one of the second regions in substantially the same position as the first region has an unrecorded sector devoid of the first data or of second data designated by a user, then the first data is written to the unrecorded sector in the first region of interest or in the positionally corresponding second region; the recording control means further controlling the data recording in such a manner that if the first data or the second data is written to the first region or the second region thus eliminating the unrecorded sector from the first or the second region and if an unrecorded sector is detected in the first or the second region different from the other region from which the unrecorded sector has been eliminated, then the first data is written to the detected unrecorded sector.

Preferably, if no unrecorded sector is detected in the first region of interest and in the second region at substantially same physical position as the first region, or if the first or the second data is written to the unrecorded sector in the first region of interest or in the second region at substantially the same physical position as the first region thus eliminating the unrecorded region from the targeted first region or the second region, then the recording control means may gain access to another first region and another second region next to the currently handled first and second regions, and write the first data to any unrecorded sector in the newly accessed first and second regions.

Preferably, the recording apparatus of the present invention may further include storage means for storing information for determining the position to which the second data was last written; wherein, if an unrecorded sector is detected in any one of all the first regions in the first recording layer and in the second region at substantially the same position as the first region of interest in the second layer, then the recording control means may control the data recording to the data recording medium in such a manner that the first data is preferentially written to the unrecorded sector in the first or the second region in the recording layer different from the recording layer including the region to which the second data was written as determined by the information.

Preferably, the recording apparatus of the present invention may further include storage means for storing information which is about each of the first and the second regions and which determines the position to which the second data was last written in one of the first regions or in the second region at substantially the same position as the first region of interest; wherein, if an unrecorded sector is detected in one of the first regions of interest and in the second region at substantially the same position as the first region of interest, then the recording control means may control the data recording to the data recording medium in such a manner that the first data is preferentially written to the unrecorded sector in the first or the second region different from the region to which the second data was written as determined by the information.

According to another embodiment of the present invention, there is provided a recording method the steps of: dividing for management purposes a recording area of a first recording layer of the data recording medium into a plurality of first recording regions and a recording area of a second recording layer of the same medium into a plurality of second recording regions at substantially the same physical positions as the first recording regions; and controlling data recording to the data recording medium in such a manner that if one of the first regions targeted to be written with first data for formatting or one of the second regions in substantially the same position as the first region has an unrecorded sector devoid of the first data or of second data designated by a user, then the first data is written to the unrecorded sector in the first region of interest or in the positionally corresponding second region; the controlling step further controlling the data recording in such a manner that if the first data or the second data is written to the first region or the second region thus eliminating the unrecorded sector from the first or the second region and if an unrecorded sector is detected in the first or the second region different from the other region from which the unrecorded sector has been eliminated, then the first data is written to the detected unrecorded sector.

According to a further embodiment of the present invention, there is provided a program including the steps of: dividing for management purposes a recording area of a first recording layer of the data recording medium into a plurality of first recording regions and a recording area of a second recording layer of the same medium into a plurality of second recording regions at substantially the same physical positions as the first recording regions; and controlling data recording to the data recording medium in such a manner that if one of the first regions targeted to be written with first data for formatting or one of the second regions in substantially the same position as the first region has an unrecorded sector devoid of the first data or of second data designated by a user, then the first data is written to the unrecorded sector in the first region of interest or in the positionally corresponding second region; the controlling step further controlling the data recording in such a manner that if the first data or the second data is written to the first region or the second region thus eliminating the unrecorded sector from the first or the second region and if an unrecorded sector is detected in the first or the second region different from the other region from which the unrecorded sector has been eliminated, then the first data is written to the detected unrecorded sector.

According to an even further embodiment of the present invention, there is provided a program for a recording medium including the steps of: dividing for management purposes a recording area of a first recording layer of the data recording medium into a plurality of first recording regions and a recording area of a second recording layer of the same medium into a plurality of second recording regions at substantially the same physical positions as the first recording regions; and controlling data recording to the data recording medium in such a manner that if one of the first regions targeted to be written with first data for formatting or one of the second regions in substantially the same position as the first region has an unrecorded sector devoid of the first data or of second data designated by a user, then the first data is written to the unrecorded sector in the first region of interest or in the positionally corresponding second region; the controlling step further controlling the data recording in such a manner that if the first data or the second data is written to the first region or the second region thus eliminating the unrecorded sector from the first or the second region and if an unrecorded sector is detected in the first or the second region different from the other region from which the unrecorded sector has been eliminated, then the first data is written to the detected unrecorded sector.

Where the recording medium, recording method, program, or recording medium of the present invention is in use as outlined above, a recording area of a first recording layer of the data recording medium is divided for management purposes into a plurality of first recording regions and a recording area of a second recording layer of the same medium is likewise divided into a plurality of second recording regions at substantially the same physical positions as the first recording regions. Data recording to the data recording medium is controlled in such a manner that if one of the first regions targeted to be written with first data for formatting or one of the second regions in substantially the same position as the first region has an unrecorded sector devoid of the first data or of second data designated by a user, then the first data is written to the unrecorded sector in the first region of interest or in the positionally corresponding second region. The data recording is further controlled in such a manner that if the first data or the second data is written to the first region or the second region thus eliminating the unrecorded sector from the first or the second region and if an unrecorded sector is detected in the first or the second region different from the other region from which the unrecorded sector has been eliminated, then the first data is written to the detected unrecorded sector.

According to a still further embodiment of the present invention, there is provided a recording apparatus including: first recording control means for controlling data recording to the data recording medium in such a manner that if an instruction to eject the data recording medium from the recording apparatus is given, with data having been written to recording areas of each of the recording layers of the medium, then an area indicating a temporary recording area end at substantially the same physical position across all the recording layers is created in reference to the position of the data written in the radially outermost recording area of the data recording medium; and second recording control means for controlling the data recording to the data recording medium in such a manner that if there exist unrecorded sectors devoid of data radially inside of the area indicating the temporary recording area end in each of the recording layers, then formatting data is written to the unrecorded sectors.

According to a yet further embodiment of the present invention, there is provided a recording method including the steps of: firstly controlling data recording to the data recording medium in such a manner that if an instruction to eject the data recording medium from the recording apparatus is given, with data having been written to recording areas of each of the recording layers of the medium, then an area indicating a temporary recording area end at substantially the same physical position across all the recording layers is created in reference to the position of the data written in the radially outermost recording area of the data recording medium; and secondly controlling the data recording to the data recording medium in such a manner that if there exist unrecorded sectors devoid of data radially inside of the area indicating the temporary recording area end in each of the recording layers, then formatting data is written to the unrecorded sectors.

According to another embodiment of the present invention, there is provided a program including the steps of: firstly controlling data recording to the data recording medium in such a manner that if an instruction to eject the data recording medium from the recording apparatus is given, with data having been written to recording areas of each of the recording layers of the medium, then an area indicating a temporary recording area end at substantially the same physical position across all the recording layers is created in reference to the position of the data written in the radially outermost recording area of the data recording medium; and secondly controlling the data recording to the data recording medium in such a manner that if there exist unrecorded sectors devoid of data radially inside of the area indicating the temporary recording area end in each of the recording layers, then formatting data is written to the unrecorded sectors.

According to a further embodiment of the present invention, there is provided a program for a recording medium including the steps of: firstly controlling data recording to the data recording medium in such a manner that if an instruction to eject the data recording medium from the recording apparatus is given, with data having been written to recording areas of each of the recording layers of the medium, then an area indicating a temporary recording area end at substantially the same physical position across all the recording layers is created in reference to the position of the data written in the radially outermost recording area of the data recording medium; and secondly controlling the data recording to the data recording medium in such a manner that if there exist unrecorded sectors devoid of data radially inside of the area indicating the temporary recording area end in each of the recording layers, then formatting data is written to the unrecorded sectors.

Where the above-outlined recording medium, recording method, program, or recording medium of the present invention is in use, data recording to the data recording medium is first controlled in such a manner that if an instruction to eject the data recording medium from the recording apparatus is given, with data having been written to recording areas of each of the recording layers of the medium, then an area indicating a temporary recording area end at substantially the same physical position across all the recording layers is created in reference to the position of the data written in the radially outermost recording area of the data recording medium. The data recording to the data recording medium is further controlled in such a manner that if there exist unrecorded sectors devoid of data radially inside of the area indicating the temporary recording area end in each of the recording layers, then formatting data is written to the unrecorded sectors.

Effect of the Invention

According to the present invention, as outlined above, data can be reproduced from optical disks, in particular from two-layer optical disks that have yet to be formatted completely.

BRIEF DESCRIPTION OF THE DRAWINGS

FIGS. 4A and 4B are schematic views showing recording areas of an opposite type optical disk.

FIG. 5 is a tabular view listing typical information to be recorded to a zone called FDCB.

FIG. 14 is a tabular view explanatory of the last written address for each region Rx.

DESCRIPTION OF REFERENCE SYMBOLS 31 recording and reproducing apparatus, 32 information processing apparatus, 33 optical disk, 51 control section, 52 work memory, 55 optical pickup, 56 signal processing section, 71 reproduced signal processing section, 72 memory controller, 73 buffer memory, 74 interface, 75 recording signal processing section, 331 determination section, 332 division section, 333 disk access processing section, 334 last written address storage section, 335 formatting process section, 336 formatting region storage section, 401 de-icing process section, and 402 temporary end data recording control section.

BEST MODE FOR CARRYING OUT THE INVENTION

Preferred embodiments of the present invention will now be described in reference to the accompanying drawings.

Figure 1:
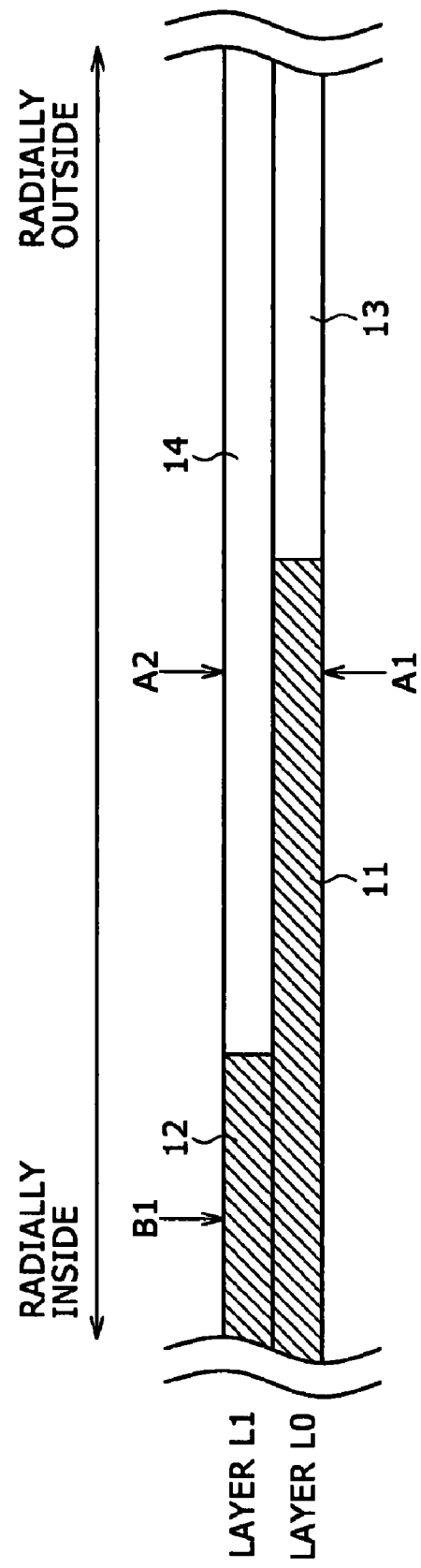
FIG. 1 is a schematic view explanatory of an ordinary two-layer optical disk.
Figure 2:
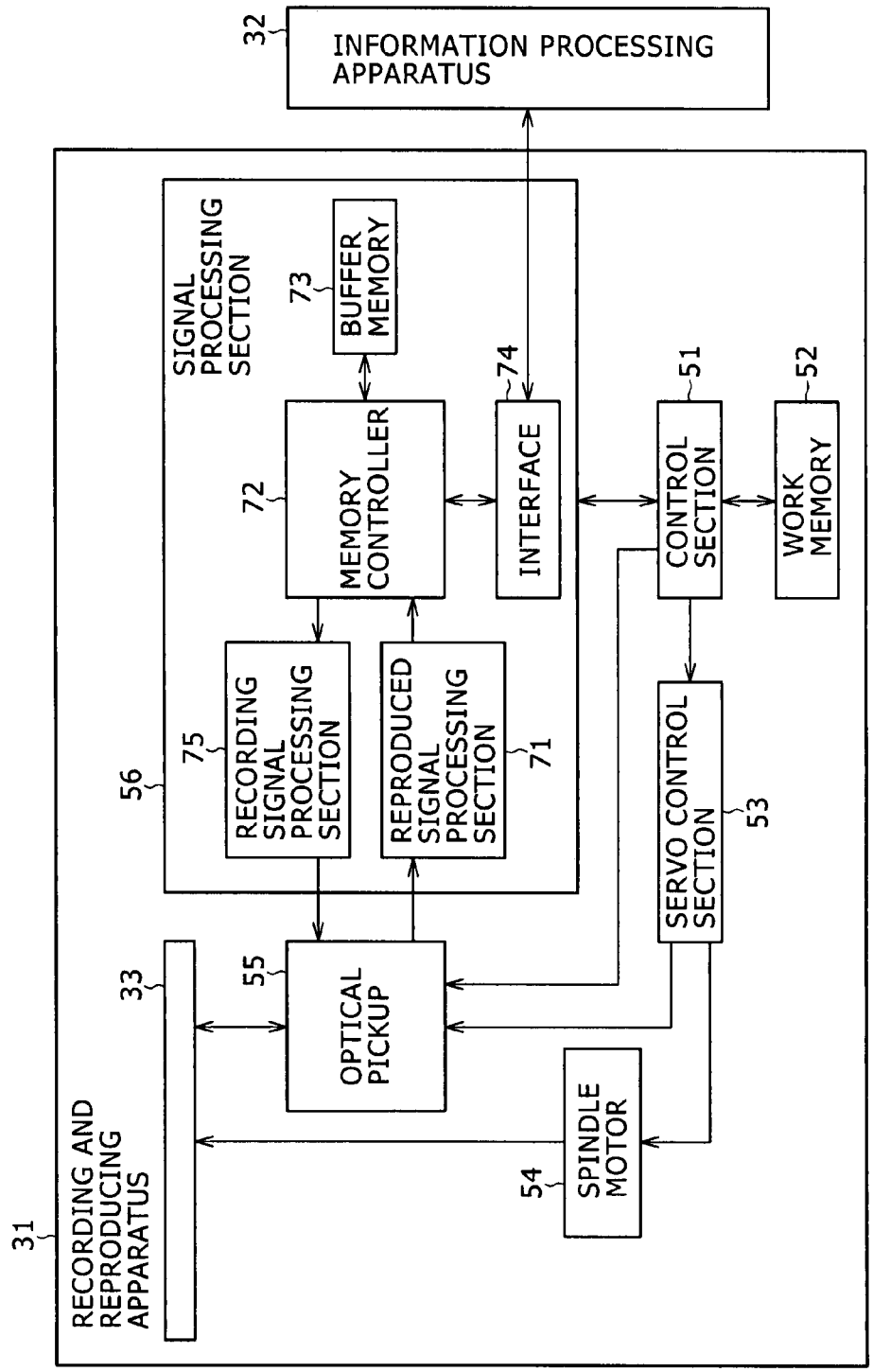
FIG. 2 is a block diagram showing a typical structure of a recording and reproducing apparatus according to the present invention.
Figure 3:
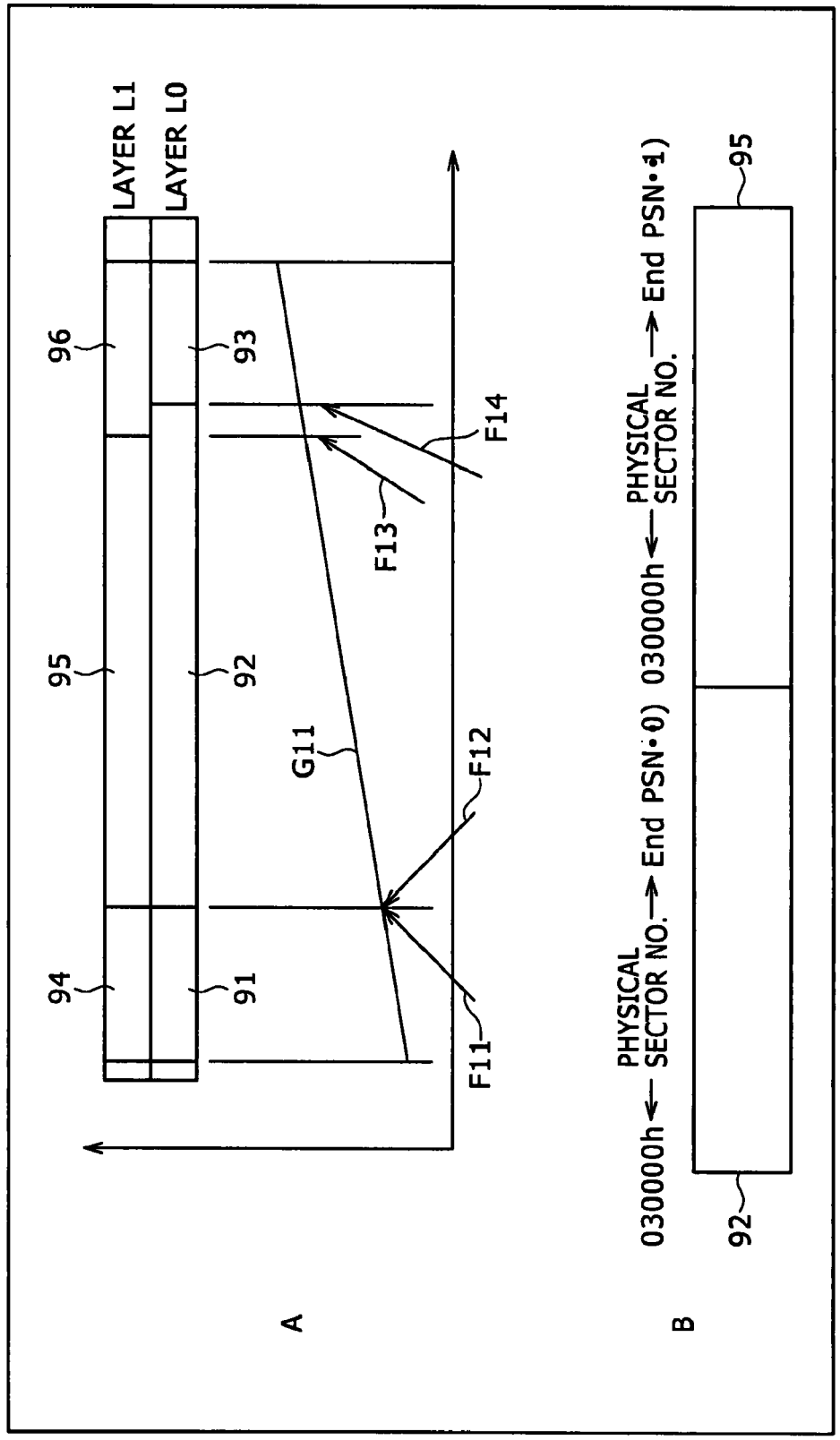
FIGS. 3A and 3B are schematic views showing recording areas of a parallel type optical disk.

FIG. 2 is a block diagram showing a typical structure of a recording and reproducing apparatus 31 according to the present invention.

The recording and reproducing apparatus 31 is connected to an information processing apparatus 32 such as a personal computer. It might happen that the information processing apparatus 32 gives an instruction to write data to an optical disk 33 such as CD-RW or DVD+RW mounted on the recording and reproducing apparatus 31 or issues a disk access request to read data from the optical disk 33. In response, the recording and reproducing apparatus 31 writes to the optical disk 33 the data supplied from the information processing apparatus 32, or reads data from the optical disk 33 and sends the retrieved data to the information processing apparatus 32. If the information processing apparatus 32 issues a disk unmount request to unmount the optical disk 33, the recording and reproducing apparatus 31 ejects the optical disk 33.

The recording and reproducing apparatus 31 is structured to include a control section 51, a work memory 52, a servo control section 53, a spindle motor 54, an optical pickup 55, and a signal processing section 56.

The control section 51 is typically composed of a general-purpose central processor or microprocessor or of a dedicated controller and controls the recording and reproducing apparatus 31 as a whole. Illustratively, the control section 51 made up of a general-purpose central processor or microprocessor reads stored programs into the work memory 52 for execution thereby controlling the entire recording and reproducing apparatus 31. Given the disk unmount request from the information processing apparatus 31 via the signal processing section 56, the control section 51 causes the recording and reproducing apparatus 31 to eject the optical disk 33.

If a disk access request to write data is received from the information processing apparatus 32 through the signal processing section 56, the control section 51 controls the signal processing section 56 to write to the optical disk 33 the data held in the work memory 52 or the data supplied from the information processing apparatus 32. If a disk access request to read data is received from the information processing apparatus 32 via the signal processing section 56, the control section 51 controls the signal processing section 56 to read data from the optical disk 33. The data thus retrieved is either fed to the information processing apparatus 32 or sent to the control section 51.

When the optical disk 33 is mounted on the spindle of the spindle motor 54, the control section 51 controls the signal processing section to read data from the optical disk 33. The retrieved data is supplied to the control section 51. With the optical disk 33 mounted on the spindle of the spindle motor 54, the control section may also control the signal processing section 56 to write the data generated by the section 56 to the optical disk 33.

If a disk access request is sent from the information processing apparatus 32 or if the optical disk 33 is mounted on the spindle of the spindle motor 54, the control section 51 generates a signal for rotationally driving the optical disk 33 and supplies the generated signal to the servo control section 53.

When writing or reading data to or from the optical disk 33, the control section 51 controls the optical pickup 55 to emit a light beam to the disk 33. Furthermore, the control section 51 generates tracking and focus control signals based on a tracking error signal and a focus error signal sent from the signal processing section 56. The control signals thus generated are supplied to the servo control section 53.

The work memory 52 is typically made up of a volatile or nonvolatile semiconductor memory and retains previously stored programs or predetermined data that may be supplied to the control section 51. As needed, the work memory 52 accommodates the data and programs sent from the information processing apparatus 32. The work memory 52 also supplies its stored data to the control section 51. Illustratively, the work memory 52 stores the data or the programs sent from the information processing apparatus 32 or from the signal processing section 56 and accommodates the data or programs retrieved from the optical disk 33 by way of the control section 51.

In keeping with the signal from the control section 51 for rotationally driving the optical disk 33, the servo control section 53 rotates the spindle of the spindle motor 54. Furthermore, the servo control section 53 drives the optical pickup 55 based on control signals coming from the control section 51 so as to move the optical pickup 55 relative to the optical disk 33.

Under control of the servo control section 53, the spindle motor 54 rotationally drives the optical disk 33 mounted on the spindle.

The optical pickup 55 is driven under tracking and focus control of the servo control section 53. Illustratively, the optical pickup 55 is subjected to tracking control by the servo control section 53 in such a manner that the spot of light emitted by the optical pickup 55 to the optical disk 33 follows the track on the disk 33. The optical pickup 55 is also subjected to focus control by the servo control section 53 in such a manner that the spot of light emitted by the optical pickup 55 to the optical disk 33 is focused onto the recording layer of the disk 33.

Under control of the control section 51, the optical pickup 55 energizes its internal laser diode to emit a light beam (laser) to the optical disk 33. More specifically, when data is to be written to the optical disk 33, the optical pickup 55 under control of the control section 51 varies the output intensity of the light emitted by the laser diode in keeping with a recording signal supplied from the signal processing section 56.

By emitting the light beam to the optical disk 33, the optical pickup 55 receives the light reflected from the disk 33 and converts the received light into an electrical signal representative of the intensity of the light. The electrical signal thus acquired is supplied to the signal processing section 56.

When data is to be written to the optical disk 33, the signal processing section 56 under control of the control section 51 generates the recording signal representative of the data to be written to the disk 33. The recording signal thus generated is fed to the optical pickup 55. When data is to be read from the optical disk 33, the signal processing section 56 under control of the control section 51 reproduces the data from an electrical signal which is received from the optical pickup 55 and which represents the intensity of the light received by the pickup 55. The reproduced data is sent either to the control section 51 or to the information processing apparatus 32.

The signal processing section 56 is structured to include a reproduced signal processing section 71, a memory controller 72, a buffer memory 73, an interface 74, and a recording signal processing section 75. The interface 74 is connected to the information processing apparatus 32.

The reproduced signal processing section 71 generates a reproduced signal that reproduces data from the optical disk 33 by rectifying the waveform of the electrical signal fed from the optical pickup 55 and by extracting specific frequency components from the waveform-rectified signal. Illustratively, the reproduced signal processing section 71 subjects the reproduced signal thus generated to particular processing such as eight-sixteen demodulation and sends the data resulting from the process to the memory controller 72.

On the basis of the electrical signal coming from the optical pickup 55, the reproduced signal processing section 71 generates the tracking error signal and focus error signal. The tracking error signal and focus error signal thus generated are supplied to the memory controller 72.

The memory controller 72 forwards the data coming from the reproduced signal processing section 71 to the buffer memory 73 as needed. Given data either from the reproduced signal processing section 71 or from the buffer memory 73, the memory controller 72 forwards the data to the control section 51 or to the information processing apparatus 32 through the interface 74.

The memory controller 72 also forwards the tracking error signal and focus error signal coming from the reproduced signal processing section 71 to the control section 51.

Furthermore, the memory controller 72 supplies as needed the buffer memory 73 either with the data sent from the information processing apparatus 32 via the interface 74 for recording to the optical disk 33 or with predetermined data fed from the control section 51. The memory controller 72 also supplies the recording signal processing section 75 with the data retrieved from the buffer memory 73, with the data fed from the information processing apparatus 32, or with predetermined data sent from the control section 51.

The buffer memory 73 is illustratively composed of a volatile memory such as DRAM (Dynamic Random Access Memory) and temporarily retains data coming from the memory controller 72.

Illustratively, the recording signal processing section 75 subjects the data fed by the memory controller 72 for recording to the optical disk 33 to specific processing such as eight-sixteen demodulation and sends the data resulting from the process to the optical pickup 55.

Generally, of the two data-recording layers constituting a two-layer optical disk having one recordable side, the layer closer to the light-emitting optical pickup is called the layer L0 and the layer away from the optical pickup is called the layer L1. The two-layer optical disk comes in two types: parallel type optical disk, and opposite type optical disk.

On the parallel type optical disk, a lead-in area is created radially inside of a recording area in each of the layers L0 and L1. A read operation on the recording areas of the layers L0 and L1 involves reading data from the radially innermost side to the radially outermost side of each layer on the optical disk. In the event of a read operation on the recording area in the layer L0 on the opposite type optical disk, data is read from the radially innermost side to the radially outermost side of the optical disk. By contrast, when data is to be read from the recording area of the L1 layer, the data is read from the radially outermost side to the radially innermost side of the optical disk.

The parallel and opposite type optical disks will now be explained in reference to FIGS. 3A through 4B.

FIGS. 3A and 3B are schematic views showing recording areas of the parallel type optical disk. In FIG. 3A, the vertical direction denotes the physical sector numbers of the physical sectors created in the recording areas of the optical disk, and the horizontal direction goes from the radially innermost side to the radially outermost side of the optical disk. A straight line G11 indicates the physical sector numbers of several positions in the recording areas of the optical disk. Arrows F11 through F14 point to the positions of interest on the straight line G11.

As shown in FIG. 3A, a lead-in area 91 is created radially inside of the recording area in the layer L0. Next to the lead-in area 91 is a user area 92 to which to write data. Next to the user area 92 and radially outermost of the recording area in the layer L0 is a lead-out area 93 indicating the ending position of the user area 92 in the layer L0.

A lead-in area 94 is created radially inside of the recording area in the layer L1. Next to the lead-in area 94 is a user area 95 to which to write data. Next to the user area 95 and radially outermost of the recording area in the layer L1 is a lead-out area 96 indicating the ending position of the user area 95 in the layer L1. The lead-out area 96 of the layer L1 is slightly greater than the lead-out area 93 of the layer L0.

Suppose that the recording and reproducing apparatus 31 reads data successively starting from the beginning of the user area 92 (i.e., from the position next to the lead-in area 91) followed by the user area 95 in the layer L0. In that case, the recording and reproducing apparatus 31 first reads data from the user area 92 successively starting from its leftmost position toward the right in the layer L0 as seen in FIG. 3A. Having read data from the rightmost position of the user area 92 (i.e., from the position adjacent to the lead-out area 93), the recording and reproducing apparatus 31 then reads data from the user area 95 consecutively starting from its rightmost position toward the left in the layer L1.

Suppose now that as when reading data, the recording and reproducing apparatus 31 successively writes user-designated data to the user areas 92 and 95 starting from the beginning of the user area 92 in the layer L0 (i.e., from the position next to the lead-in area 91). In such a case, the recording and reproducing apparatus 31 first writes the data to the user area 92 starting from its leftmost position toward the right in the layer L0. Having written the data to the rightmost position of the user area 92 (i.e., to the position adjacent to the lead-out area 93), the recording and reproducing apparatus 31 then writes the data to the user area 95 consecutively starting from its leftmost position toward the right in the layer L1.

The recording areas of the optical disk are divided into regions of a predetermined size (i.e., physical sectors). As indicated by the straight line G11, the physical sectors are assigned physical sector numbers (PSN) that continue serially from the radially innermost physical sector to the radially outermost physical sector on the optical disk. Illustratively, the physical sector number of the physical sector (recording area position) indicated by the point of intersection of the arrow F11 and straight line G11 denotes the physical sector including the ending position of the lead-in area 91 as well as the physical sector number (e.g., "02FFFFh") of the physical sector including the ending position of the lead-in area 94.

Likewise, the physical sector number of the physical sector indicated by the point of intersection of the arrow F12 and straight line G11 denotes the physical sector including the starting position (beginning) of the user area 92 as well as the physical sector number (e.g., "030000h") of the physical sector including the starting position of the user area 95. The physical sector number of the physical sector indicated by the point of intersection of the arrow F13 and straight line G11 denotes the physical sector including a particular position of the user area 92 as well as the physical sector number of the physical sector including the ending position of the user area 95. The physical sector number of the physical sector indicated by the point of intersection of the arrow F14 and straight line G11 denotes the physical sector including the ending position of the user area 92 as well as the physical sector number of the physical sector including a specific position of the lead-out area 96.

Thus as shown in FIG. 3B, the same physical sector number "030000h" in fact represents two physical sectors: the physical sector including the starting position (beginning) of the user area 92, and the physical sector including the starting position of the user area 95. In FIG. 3B, the left-hand side of the user area 92 indicates radially inside recording areas; the right-hand side of the user area 92 denotes radially outside recording areas. Similarly, the left-hand side of the user area 95 indicates radially inside recording areas; the right-hand side of the user area 95 denotes radially outside recording areas.

In FIG. 3B, the physical sector including the ending position of the user area 92 is assigned the physical sector number "End PSN(0)," the physical sector corresponding to the point of intersection of the arrow F14 and straight line G11 in FIG. 3A. The physical sector including the ending position of the user area 95 is given the physical sector number "End PSN (1)," the physical sector corresponding to the point of intersection of the arrow F13 and straight line G11 in FIG. 3A.

Meanwhile, as shown in FIG. 4A, the layer L1 of the opposite type optical disk has no lead-in area.

In FIG. 4A, the vertical direction denotes the physical sector numbers of the physical sectors created in the recording areas of the optical disk, and the horizontal direction goes from the radially innermost side to the radially outermost side. Straight lines G21 and G22 indicate the physical sector numbers of several positions in the recording areas of the layers L0 and L1 on the optical disk. Arrows F21 through F23 point to the positions of interest on the straight line G21; arrows F24 and F25 denote the positions of interest on the straight line G22.

As shown in FIG. 4A, a lead-in area 111 is created radially inside of the recording area in the layer L0. Next to the lead-in area 111 is a user area 112 to which to write data. Next to the user area 112 and radially outermost of the recording area in the layer L0 is a middle area 113 indicating both the ending position of the user area 112 in the layer L0 and a turning position between the layer L0 and the layer L1.

Radially outside of the recording area in the layer L1 is another middle area 114 indicating both the starting position of the user area 115 in the layer L1 and a turning position between the layer L0 and the layer L1. To the left of the middle area 114 is a user area 115 to which to write data. To the left of the user area 115 and radially innermost of the recording area in the layer L1 is a lead-out area 116 pointing to the ending position of the user area 115 in the layer L1. The lead-out area 116 of the layer L1 is slightly larger than the lead-in area 111 of the layer L0.

Suppose that the recording and reproducing apparatus 31 reads data successively starting from the beginning of the user area 112 (i.e., from the position next to the lead-in area 111) followed by the user area 115 in the layer L0. In that case, the recording and reproducing apparatus 31 first reads data from the user area 112 successively starting from its leftmost position toward the right in the layer L0 as seen in FIG. 4A. Having read data from the rightmost position of the user area 112 (i.e., from the position adjacent to the middle area 113), the recording and reproducing apparatus 31 then reads data from the user area 115 consecutively starting from its rightmost position (i.e., from the position adjacent to the middle area 114) toward the leftmost position (i.e., position adjacent to the lead-out area 116) in the layer L1.

Suppose now that as when reading data, the recording and reproducing apparatus 31 successively writes user-designated data to the user areas 112 and 115 starting from the beginning of the user area 112 in the layer L0 (i.e., from the position next to the lead-in area 111). In such a case, the recording and reproducing apparatus 31 first writes the data to the user area 112 starting from its leftmost position toward the right in the layer L0. Having written the data to the rightmost position of the user area 112 (i.e., to the position adjacent to the middle area 113), the recording and reproducing apparatus 31 then writes the data to the user area 115 consecutively starting from its rightmost position (i.e., from the position adjacent to the middle area 114) to the leftmost position (i.e., position adjacent to the lead-out area 116) in the layer L1.

The recording areas of the optical disk are divided into regions of a predetermined size (i.e., physical sectors). As indicated by the straight line G21, the physical sectors are assigned physical sector numbers (PSN) that continue serially from the radially innermost physical sector to the radially outermost physical sector in the layer L0 on the optical disk. Illustratively, the physical sector number of the physical sector (recording area position) indicated by the point of intersection of the arrow F21 and straight line G21 denotes the physical sector number (e.g., "02FFFFh") of the physical sector including the ending position of the lead-in area 111.

The physical sector number of the physical sector indicated by the point of intersection of the arrow F22 and straight line G21 denotes the physical sector including the starting position (beginning) of the user area 112 (e.g., "030000h"). The physical sector number of the physical sector indicated by the point of intersection of the arrow F23 and straight line G21 denotes the physical sector including the ending position of the user area 112.

As indicated by the straight line G22, the physical sectors including the recording area in the layer L1 are assigned physical sector numbers (PSN) that continue serially from the radially outermost physical sector to the radially innermost physical sector on the optical disk. The physical sector number of the physical sector indicated by the point of intersection of the arrow F24 and straight line G22 denotes the physical sector at the ending position of the user area 112 in the layer L0 as well as the physical sector including the starting position (beginning) of the user area 115 in the layer L1. That is, the physical sector whose physical sector number is indicated by the point of intersection of the arrow F23 and straight line G21 is the last physical sector in the user area 112 of the layer L0. Next to that physical sector in the layer L0, the first physical sector in the layer L1 has its physical sector number indicated by the point of intersection of the arrow F24 and straight line G22. The physical sector number of the physical sector including the ending position of the user area 115 is indicated by the point of intersection of the arrow F25 and straight line G22.

Thus as shown in FIG. 4B, the physical sector number (given as "030000h") of the physical sector including the starting position (beginning) of the user area 112 differs from the physical sector number of the physical sector including the starting position of the user area 115. In FIG. 4B, the left-hand side of the user area 112 indicates radially inside recording areas; the right-hand side of the user area 112 denotes radially outside recording areas. The left-hand side of the user area 115 indicates radially outside recording areas; the right-hand side of the user area 115 denotes radially inside recording areas.

In FIG. 4B, the physical sector including the ending position of the user area 112 is assigned the physical sector number "End PSN(0)," the physical sector corresponding to the point of intersection of the arrow F23 and straight line G21 in FIG. 4A. The physical sector including the starting position of the user area 115 is given the physical sector number "End PSN(0)," the physical sector corresponding to the point of intersection of the arrow F24 and straight line G22 in FIG. 4A. The physical sector including the ending position of the user area 115 is assigned the physical sector number "End PSN(1)," the physical sector corresponding to the point of intersection of the arrow F25 and straight line G22 in FIG. 4A.

The formatting of the optical disk 33 is described below.

When the optical disk 33 is mounted on the recording and reproducing apparatus 31, the apparatus 31 initializes the disk 33 by writing necessary information (data) to the lead-in area of the disk 33.

More specifically, when the optical disk 33 is mounted on the recording and reproducing apparatus 31, the control section 51 acquires from the work memory 52 the necessary data to be written to the lead-in area and supplies the acquired data to the signal processing section 56. The memory controller 72 forwards the data received from the control section 51 to the recording signal processing section 75. The recording signal processing section 75 subjects the data coming from the memory controller 72 to predetermined processing such as eight-sixteen modulation and feeds a recording signal resulting from the process to the optical pickup 55. Under control of the control section 51, the optical pickup 55 emits light to the lead-in area of the optical disk 33 in a manner reflecting the recording signal sent from the signal processing section 56. In the ensuing description, the process of initializing the optical disk 33 by writing necessary data to its lead-in area may be called partial formatting where appropriate.

A zone called "Inner Disk Identification Zone" in the lead-in area of the optical disk 33 contains a zone called "FDCB" that stores format-related information including information about the data recorded on the optical disk 33. Upon partial formatting of the optical disk 33, the "FDCB" zone is divided illustratively into fields such as those shown in FIG. 5, each field being arranged to accommodate relevant information (data).

For example, data is written to the FDCB zone in units of ECC (error checking and correction) blocks for error correction. FIG. 5 lists typical fields to be written with information, the physical sector numbers of the physical sectors containing the ECC blocks for recording the information, the positions to which to write the information, and the sizes of the fields for accommodating the information.

Illustratively, in the physical sector having a physical sector number "0" in the FDCB zone, a four-byte field "Content Descriptor" is formed between a position D0 and a position D3 over the sector length ranging from the position D0 representing the beginning of this physical sector in bytes to a position D2047 denoting the end of the physical sector. This four-byte field is written with ID (identification) information in ASCII code. Each of the positions D0 through D2047 represents a one-byte recording field. The ID information is a fixed value "0x46444300" indicating "FDC" and version number "0". Another four-byte field "Unknown Content Description Actions" ranging from a position D4 to a position D7 in the physical sector having the physical sector number "0" is written with information illustratively about some process details to be limited if the system does not support "Content Descriptor". A 32-byte field "Drive ID" ranging from a position D8 to a position D39 in the physical sector having the physical sector number "0" is written with drive information about the drive that was used to record data to the FDCB zone. A four-byte field "FDCB update count" ranging from a position D40 to a position D43 in the physical sector having the physical sector number "0" is written with the number of times the data in the FDCB zone has been updated. The data update count written in the field "FDCB update count" is incremented by "1" every time the data in the FDCB zone is updated.

A four-byte field "Formatting status and mode" ranging from a position D44 to a position D47 in the physical sector having the physical sector number "0" is written with information that indicates format status, verify status, and recording status. For example, a two-bit field ranging from bit 6 to bit 7 in the first byte of the field accommodating the information about the format status in the field "Formatting status and mode" is written with information indicative of the format status of the optical disk 33. Format status information "00" indicates that the optical disk 33 has yet to be formatted; format status information "01" indicates that the optical disk 33 is partially formatted; format status information "10" indicates that the optical disk 33 is fully formatted by the recording and reproducing apparatus 31 (i.e., by the user); format status information "11" indicates that the optical disk 33 was fully formatted by its manufacturer.

A four-byte field "Last written address" ranging from a position D48 to a position D51 in the physical sector having the physical sector number "0" is written with the physical sector number of the physical sector to which data was last written. Another four-byte field "Last verified address" ranging from a position D52 to a position D55 in the physical sector having the physical sector number "0" is written with the physical sector number of the physical sector that was last verified (i.e., checked for data error). A four-byte field "Bitmap Start Address" ranging from a position D56 to a position D59 in the physical sector having the physical sector number "0" is written with the physical sector number of the physical sector including the first ECC block indicated by another field "Formatting bitmap". A four-byte field "Bitmap Length" ranging from a position D60 to a position D63 in the physical sector having the physical sector number "0" is written with the number of ECC blocks indicated by the field "Formatting bitmap".

A 32-byte field "Disk ID" ranging from a position D64 to a position D95 in the physical sector having the physical sector number "0" is written with the ID information identifying the optical disk 33. Another 32-byte field "Application dependent" ranging from a position D96 to a position D127 in the physical sector having the physical sector number "0" is for use by application software and is set to "0" if nothing is designated thereby. A 64-byte field "List of DCBs" ranging from a position D128 to a position D191 in the physical sector having the physical sector number "0" is written with information constituting a list of DCB arrangements. A 1,856-byte field "Reserved and set to (00)" ranging from a position D192 to a position D2047 in the physical sector having the physical sector number "0" is written with a fixed value "0x00".

An 18,432-byte field "Formatting bitmap" ranging from a position D0 to a position D2047 in each of the physical sectors having physical sector numbers "1" through "9" is written with information about ECC block recording status. Illustratively, bit 0 of the first byte in the field "Formatting bitmap" is written with the ECC block recording status indicated by the field "Bitmap Start Address". Bit 1 of the first byte is written with the recording status of the next ECC block indicated by the field "Bitmap Start Address". Illustratively, the ECC block recording status bit that is set to "0" indicates that data is recorded in the ECC block; the ECC block recording stats bit that is set to "1" indicates that data is not recorded in the ECC block. A 12,288-byte field "Reserved and set to (00)" ranging from a position D0 to a position D2047 in each of the physical sectors having physical sector numbers "10" through "15" is written with a fixed value "0x00".

When the optical disk 33 is partially formatted, the recording and reproducing apparatus 31 generates a signal saying that partial formatting of the optical disk 33 is completed and sends the generated signal to the information processing apparatus 32. The signal from the recording and reproducing apparatus 31 announcing the completion of partial formatting of the optical disk 33 enables the information processing apparatus 32 to start accessing the optical disk 33 mounted on the recording and reproducing apparatus 31. The information processing apparatus 32 can then write or read data to or from the optical disk 33.

Upon completion of the partial formatting of the optical disk 33, the recording and reproducing apparatus 31 may receive a disk access request or a disk unmount request from the information processing apparatus 32. In response to the disk access request, the recording and reproducing apparatus 31 writes to the optical disk 33 the data supplied by the information processing apparatus 32, or reads data from those regions (positions) of the optical disk 33 which were designated by the information processing apparatus 32 and sends the retrieved data to the apparatus 32. If the disk unmount request is received from the information processing apparatus 32, then the recording and reproducing apparatus 31 ejects the optical disk 33. In the ensuing description, the process performed by the recording and reproducing apparatus 31 in response to the disk access request from the information processing apparatus 32 may be called the disk access process where appropriate.

If no disk access request is received from the information processing apparatus 32 following completion of the partial formatting of the optical disk 33, the recording and reproducing apparatus 31 enters an idle state. In that state, the recording and reproducing apparatus 31 proceeds to format the optical disk 33 (in background formatting).

If the optical disk 33 is illustratively a parallel type optical disk, then the recording and reproducing apparatus 31 writes dummy data to the user area in the layer L0 starting from a lead-in area 141 (radially inner side of the optical disk 33) of the layer L0 toward a region 142 (radially outer side of the disk 33) to which to write lead-out data. Likewise, the recording and reproducing apparatus 31 writes dummy data to the user area in the layer L1 starting from a lead-in area 143 of the layer L1 toward a region 144 to which to write lead-out data. In the ensuing description, the process of the recording and reproducing apparatus 31 writing dummy data to the sectors or regions with no dummy data (i.e., unrecorded sectors or regions) may be called the de-icing process where appropriate. The dummy data, different from the user-designated data destined for recording to the optical disk 33, is predetermined data arranged to be written to the optical disk 33 for formatting purposes.

Figure 6:
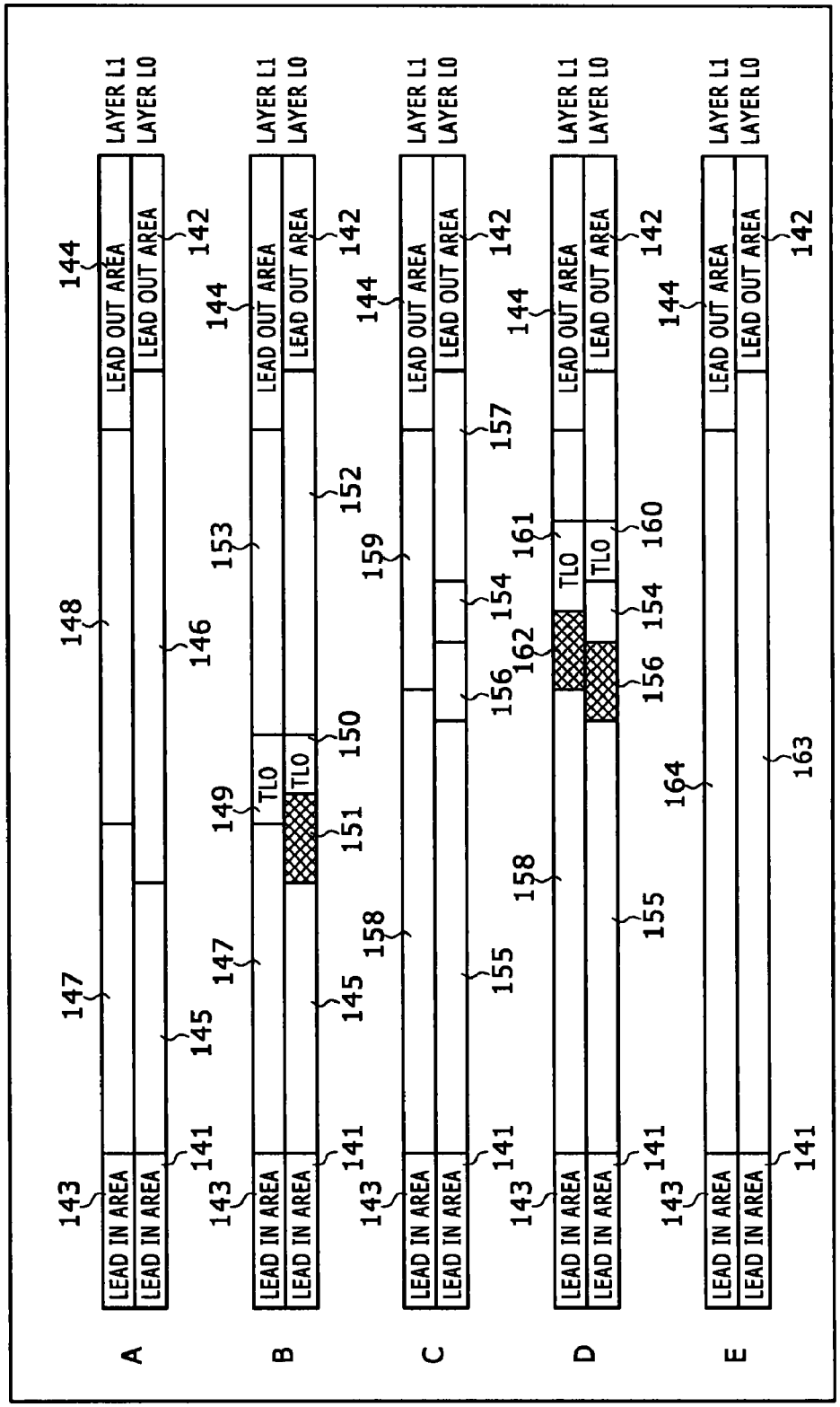
FIGS. 6A, 6B, 6C, 6D and 6E are schematic views explanatory of a background formatting process performed on the parallel type optical disk.

In FIG. 6A, the optical disk 33 is shown partially formatted. The lead-in area 141 is already recorded on the optical disk 33. In the user area of the layer L0, a region 145 is already written with dummy data whereas a region 146 has yet to be written with dummy data. In the user area of the layer L1, a region 147 is already written dummy data while a region 148 has yet to be written with dummy data.

The recording and reproducing apparatus 31 carries out the de-icing process parallelly on both the user area in the layer L0 and the user area in the layer L1. In other words, the recording and reproducing apparatus 31 performs the de-icing process in such a manner that the recorded regions in the user area of the layer L0 become substantially the same in size as the recorded regions in the user area of the layer L1.

More specifically, the recording and reproducing apparatus 31 first writes dummy data to an unrecorded region of a predetermined size (recording capacity of, say, Q1) headed by the starting position (beginning) of the user area in the layer L0. The recording and reproducing apparatus 31 then writes dummy data to an unrecorded region of the size Q1 headed by the starting position of the user area in the layer L1.

With the state of FIG. 6A in effect, the information processing apparatus 32 might issue a disk unmount request to the recording and reproducing apparatus 31. In that case, as shown in FIG. 6B, the recording and reproducing apparatus 31 stops the ongoing de-icing process, writes temporary lead-out (TLO) data to both the user area in the layer L0 and the user area in the layer L1, and ejects the optical disk 33. In FIGS. 6B through 6E as in FIG. 6A, like or corresponding areas, regions, etc., are designated by like reference numerals and their descriptions will not be repeated hereunder where redundant.

Upon receipt of the disk unmount request from the information processing apparatus 32, the recording and reproducing apparatus 31 writes a TLO area (i.e., creates the TLO area by writing necessary data) headed by (next to) the position adjacent to the data (dummy data or other data) written to the radially outermost sector (closest to the region 144 or 142) in the user areas of the layers L0 and L1. Illustratively, as shown in FIG. 6A, the ending position of the area 147 written with dummy data (i.e., de-iced) in the layer L1 is radially outside of the ending position of the de-iced area 145 filled with dummy data in the layer L0. For this reason, the recording and reproducing apparatus 31 first writes TLO data to a region 149 (to form the TLO region 149) headed by the position adjacent to the region 147 of the layer L1 as shown in FIG. 6B.

With TLO data written to the region 149, the recording and reproducing apparatus 31 writes TLO data to a region 150 in the user area of the layer L1 in such a manner that the ending position of the area 149 corresponds to the ending position of the TLO region created in the user area of the layer L1. In other words, the recording and reproducing apparatus 31 writes TLO data to the region 150 in such a manner that the distance between the starting position of the region 145 and the ending position of the region 150 equals the distance between the starting position of the region 147 and the ending position of the region 149.

The recording and reproducing apparatus 31 proceeds to write dummy data to a region 151 between the regions 145 and 150 (the region 150 may also be called the TLO region 150). With the region 151 thus de-iced, the recording and reproducing apparatus 31 ejects the optical disk 33. At this point, dummy data or other data has yet to be written starting from the ending position of the TLO region 150 to the region 142 and from the ending position of the TLO region 149 to the region 144.

Where the user areas of the layers L0 and L1 are thus de-iced in parallel, it is possible to reduce the sizes of the regions to which to write dummy data after the disk unmount request is supplied. Thus when the disk unmount request is received from the information processing apparatus 32 during background formatting, the optical disk 33 can be ejected more quickly than if the user areas are de-iced one layer at a time (e.g., the layer L0 is first de-iced, followed by the layer L1). After issuing the request to unmount the optical disk 33, the user need not wait long for the disk 33 to be ejected from the recording and reproducing apparatus 31.

Suppose that the optical disk 33 in the state of FIG. 6B is ejected from the recording and reproducing apparatus 31 and is later mounted again on the apparatus 31 and that the apparatus 31 enters an idle state thereafter. In that case, the recording and reproducing apparatus 31 starts (i.e., resumes) the background formatting process of the optical disk 33. Specifically, the recording and reproducing apparatus 31 writes dummy data to (i.e., overwrites) the TLO regions 149 and 150 shown in FIG. 6B. The recording and reproducing apparatus 31 then de-ices regions 152 and 153.

If the information processing apparatus 32 issues a disk access request asking the recording and reproducing apparatus 31 to write data to the optical disk 33, then the recording and reproducing apparatus 31 responds to the request by writing to the user areas of the optical disk 33 the data supplied by the information processing apparatus 32. Illustratively, as shown in FIG. 6C, the recording and reproducing apparatus 31 writes the data designated by the disk access request to a region 154 specified by the request. In the state of FIG. 6C, a region 154 is written with the data designated by the disk access request and a region 155 has already been de-iced. Regions 156 and 157 have no data recorded therein and have yet to be de-iced. A region 158 has been de-iced while a region 159 has no data recorded therein and has yet to be de-iced.

Suppose now that with the optical disk 33 in the state of FIG. 6C, the information processing apparatus 32 sends a disk unmount request to the recording and reproducing apparatus 31. In that case, with the ending position of the region 154 located radially outside of the ending position of the region 158 on the optical disk 33, the recording and reproducing apparatus 31 writes TLO data to a region 160 starting from the position adjacent to the ending position of the region 154 as shown in FIG. 6D. The recording and reproducing apparatus 31 further writes TLO data to a region 161 in such a manner that the ending position of the TLO region in the user area of the layer L1 corresponds to the ending position of the region 160, i.e., so that the distance between the starting position of the region 158 and the ending position of the region 161 equals the distance between the starting position of the region 155 and the ending position of the region 160. After writing TLO data to the regions 160 and 161, the recording and reproducing apparatus 31 writes dummy data to the region 156 and a region 162, both unrecorded regions, and ejects the optical disk 33.

When the optical disk 33 in the state of FIG. 6D is again mounted on the recording and reproducing apparatus 31 which then enters an idle state, the recording and reproducing apparatus 31 starts (i.e., resumes) the background formatting process of the optical disk 33. With the background formatting process of the optical disk 33 completed, a region 163 constituting the user area of the layer L0 and a region 164 making up the user area of the layer L1 are fully formatted as shown in FIG. 6E. The regions 163 and 164 are written with dummy data recorded during the de-icing process and with the data recorded as per the disk access request from the information processing apparatus 32. The regions 142 and 144 form lead-out areas written with necessary data.

Figure 7:
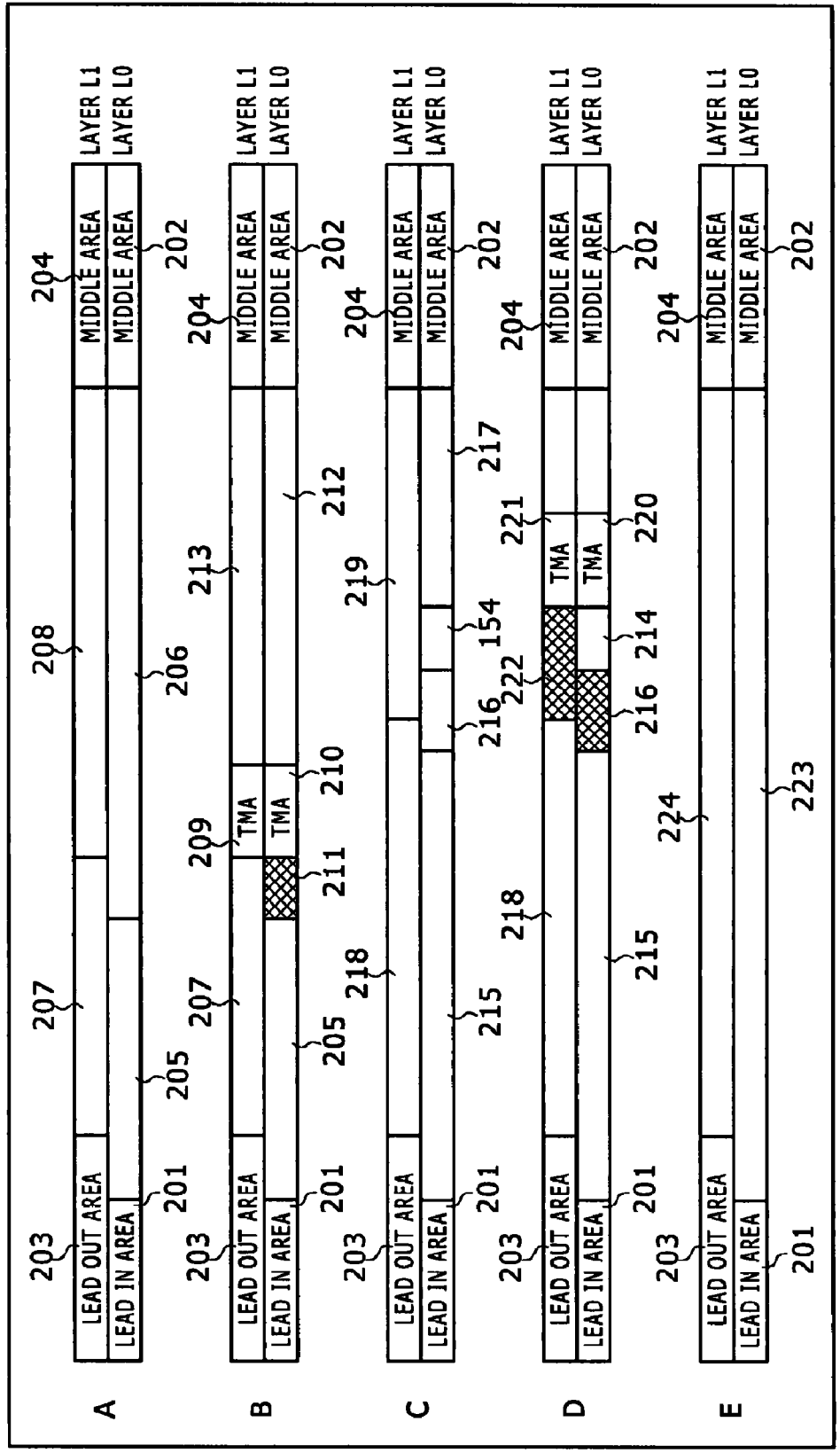
FIGS. 7A, 7B, 7C, 7D and 7E are schematic views explanatory of a background formatting process performed on the opposite type optical disk.

Suppose now that a partially formatted opposite type optical disk 33 is mounted on the recording and reproducing apparatus 31 which then enters an idle state. In such a case, as shown in FIG. 7A, the recording and reproducing apparatus 31 writes dummy data to the user area of the layer L0 starting from a lead-in area 201 (radially inner side of the optical disk 33) of the layer L0 toward a region 202 (radially outer side of the disk 33) to which to write necessary data in order to create a middle area. Likewise, the recording and reproducing apparatus 31 writes dummy data to the user area of the layer L1 starting from a lead-out area 203 in the layer L1 toward a region 204 to which to write necessary data so as to create another middle area.

The partial formatting of the optical disk 33 in the state of FIG. 7A is completed, so that the lead-in area 201 is already created on the disk 33. The regions 202 and 204 have yet to be written with the necessary data for turning these regions into middle areas. In the user area of the layer L0, a region 205 is already written with dummy data while a region 206 has yet to be written with dummy data. In the user area of the layer L1, a region 207 is already written with dummy data whereas a region 208 has yet to be written with dummy data.

Suppose also that with the state of FIG. 7A in effect, the information processing apparatus 32 issues a disk unmount request to the recording and reproducing apparatus. In that case, as shown in FIG. 7B, the recording and reproducing apparatus 31 stops the de-icing process, writes necessary data to regions 209 and 210 to turn each of them into a temporary middle area (TMA), and ejects the optical disk 33. In FIGS. 7B through 7E as in FIG. 7A, like or corresponding areas, regions, etc., are designated by like reference numerals and their descriptions will not be repeated hereunder where redundant.

Upon receipt of the disk unmount request from the information processing apparatus 32, the recording and reproducing apparatus 31 writes a TMA (i.e., creates the TMA by writing necessary data) headed by the position adjacent to the data (dummy data or other data) written to the radially outermost sector (closest to the region 202 or 204) in the user areas of the layers L0 and L1. Illustratively, as shown in FIG. 7A, the ending position of the area 207 written with dummy data (i.e., de-iced) in the layer L1 is radially outside of the ending position of the de-iced area 205 filled with dummy data in the layer L0. For this reason, the recording and reproducing apparatus 31 first writes the TMA to the region 209 (to form the TMA region 209) headed by the position adjacent to the region 207 of the layer L1 as shown in FIG. 7B.

With the TMA written to the region 209, the recording and reproducing apparatus 31 writes another TMA to the region 210 in the user area of the layer L1 in such a manner that the ending position of the area 209 corresponds to the ending position of the TMA created in the user area of the layer L1. In other words, the recording and reproducing apparatus 31 writes the TMA to the region 210 in such a manner that the distance between the starting position of the lead-in area 201 and the starting position of the region 210 equals the distance between the starting position of the lead-out area 203 and the starting position (beginning) of the region 209. The recording and reproducing apparatus 31 proceeds to write dummy data to a region 211 between the regions 205 and 210 (the region 210 may also be called the TMA region 210). With the region 211 thus de-iced, the recording and reproducing apparatus 31 ejects the optical disk 33. At this point, dummy data or other data has yet to be written starting from the ending position of the TMA region 210 to the region 202 and from the ending position of the TMA region 209 to the region 204.

Where the user areas of the layers L0 and L1 are thus de-iced in parallel, it is possible to reduce the sizes of the regions to which to write dummy data after the disk unmount request is supplied. Thus when the disk unmount request is received from the information processing apparatus 32 during background formatting, the optical disk 33 can be ejected more quickly than if the user areas are de-iced one layer at a time (e.g., the layer L0 is first de-iced, followed by the layer L1). After issuing the request to unmount the optical disk 33, the user need not wait long for the disk 33 to be ejected from the recording and reproducing apparatus 31.

Suppose that the optical disk 33 in the state of FIG. 7B is ejected from the recording and reproducing apparatus 31 and is later mounted again on the apparatus 31 and that the apparatus 31 enters an idle state thereafter. In that case, the recording and reproducing apparatus 31 starts (i.e., resumes) the background formatting process of the optical disk 33. Specifically, the recording and reproducing apparatus 31 writes dummy data to (i.e., overwrites) the TMA regions 209 and 210 shown in FIG. 7B. The recording and reproducing apparatus 31 then de-ices regions 212 and 213.

If the information processing apparatus 32 issues a disk access request asking the recording and reproducing apparatus 31 to write data to the optical disk 33, then the recording and reproducing apparatus 31 responds to the request by writing to the user areas of the optical disk 33 the data supplied by the information processing apparatus 32. Illustratively, as shown in FIG. 7C, the recording and reproducing apparatus 31 writes the data designated by the disk access request to a region 214 specified by the request. In the state of FIG. 7C, the region 214 is written with the data designated by the disk access request and a region 215 has already been de-iced. Regions 216 and 217 have no data recorded therein and have yet to be de-iced. A region 218 has been de-iced while a region 219 has no data recorded therein and has yet to be de-iced.

Suppose now that with the optical disk 33 in the state of FIG. 7C, the information processing apparatus 32 sends a disk unmount request to the recording and reproducing apparatus 31. In that case, with the ending position of the region 214 located radially outside of the ending position of the region 218 on the optical disk 33, the recording and reproducing apparatus 31 writes a TMA to a region 220 starting from the position adjacent to the ending position of the region 214 as shown in FIG. 7D. The recording and reproducing apparatus 31 further writes a TMA to a region 221 in such a manner that the ending position of the TMA region in the user area of the layer L1 corresponds to the ending position of the region 220, i.e., so that the distance between the starting position of the lead-out area 203 and the starting position of the region 221 equals the distance between the starting position of the lead-in area 201 and the starting position of the region 220. After writing the TMA to each of the regions 220 and 221, the recording and reproducing apparatus 31 writes dummy data to the region 216 and a region 222, both unrecorded regions, and ejects the optical disk 33.

When the optical disk 33 in the state of FIG. 7D is again mounted on the recording and reproducing apparatus 31 which then enters an idle state, the recording and reproducing apparatus 31 starts (i.e., resumes) the background formatting process of the optical disk 33. With the background formatting process of the optical disk 33 completed, a region 223 constituting the user area of the layer L0 and a region 224 making up the user area of the layer L1 are fully formatted as shown in FIG. 7E. The regions 223 and 224 are written with dummy data recorded during the de-icing process and with the data recorded as per the disk access request from the information processing apparatus 32. The regions 202 and 204 each form a middle area written with necessary data.

As described above, it might happen that while the recording and reproducing apparatus 31 is performing the background formatting process on a two-layer optical disk 33 (i.e., parallel or opposite type optical disk 33), the information processing apparatus 32 issues a disk unmount request to the recording and reproducing apparatus 31. In that case, a temporary lead-out area (TLO) or a temporary middle area (TMA) is created where appropriate in each of the user areas of the layers L0 and L1. This enables the recording and reproducing apparatus 31 to eject the optical disk 33 that was fully formatted in a simulated manner but not in real terms. A reproducing apparatus with no means to write can then reproduce data from the optical disk 33 that has yet to be fully formatted in actuality.

During the background formatting of the optical disk 33 by the recording and reproducing apparatus 31, the information processing apparatus 32 may illustratively issue a disk unmount request to the recording and reproducing apparatus 31. At that point, the recording and reproducing apparatus 31 ejects the optical disk 33 in the state of FIG. 7B. In this case, the regions 205 and 211 in the user area of the layer L0 are written with dummy data or other data, and so is the region 207 in the user area of the layer L1 corresponding to these regions of the layer L0 (i.e., there are no unrecorded regions).

As a result, if the optical disk 33 thus prepared is mounted on the reproducing apparatus with no recording means, the reproducing apparatus may effect a jump from any user area position within the regions 205 and 211 of the layer L0 or within that region 207 of the layer L1 which correspond to the regions in the other layer, to a desired user area position in the other layer. From that position, the reproducing apparatus may perform a seek toward the radially inner or outer side of the optical disk 33 so as to read the data therefrom.

Figure 8:
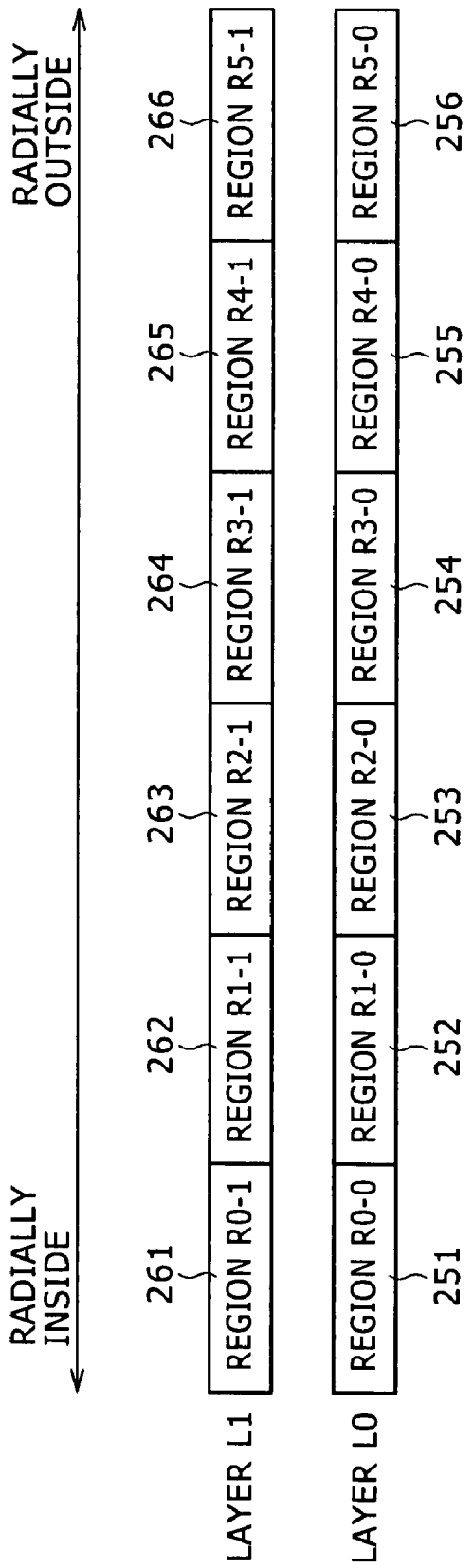
FIG. 8 is a schematic view explanatory of how user areas are typically divided.

More specifically, as shown in FIG. 8, the recording and reproducing apparatus 31 performs its background formatting process on the optical disk 33 divided into regions of a predetermined size each (recording capacity). As seen in FIG. 8, the direction from left to right represents the direction going from the radially innermost side to the radially outermost side of the optical disk 33.

In FIG. 8, the user area of the layer L0 is divided for management purposes into regions 251 through 256 of an equal size each, ranging from the radially innermost side to the radially outermost side of the optical disk 33. The user area of the layer L1 is likewise divided into regions 261 through 266 of the same size each, corresponding to the regions 251 through 256 in the user area of the layer L0 and ranging from the radially innermost side to the radially outermost side of the optical disk 33.

In the makeup of FIG. 8, the distance between the starting position of the region 251 (beginning of the user area) and the starting position of each of the regions 251 through 256 is arranged to equal the distance between the starting position of the region 261 (beginning of the user area) and the starting position of each of the regions 261 through 266. That is, the user area of the layer L0 and that of the layer L1 are divided at substantially the same positions.

Illustratively, the recording and reproducing apparatus 31 divides the user area of the layer L0 into the regions 251 through 256 in units of physical sectors, the region 251 being on the radially innermost side. It is assumed here that the regions 251 through 256 are renamed regions R0-0 through R5-0 respectively, i.e., that the region 251 is named as the region R0-0, the region 252 as the region R1-0, the region 253 as the region R2-0, the region 254 as the region R3-0, the region 255 as the region R4-0, and the region 256 as the region R5-0.

In like manner, the recording and reproducing apparatus 31 divides the user area of the layer L1 into the regions 261 through 266 positionally corresponding to the regions 251 through 256 in the layer L0, the region 261 being on the radially innermost side. It is assumed that the regions 261 through 266 are renamed regions R0-1 through R5-1 respectively, i.e., that the region 261 is named as the region R0-1, the region 262 as the region R1-1, the region 263 as the region R2-1, the region 264 as the region R3-1, the region 265 as the region R4-1, and the region 266 as the region R5-1.

In the ensuing description, the segment made up of the regions 251 and 261 will be referred to as a region R0, the segment of the regions 252 and 262 as a region R1, the segment of the regions 253 and 263 as a region R2, the segment of the regions 254 and 264 as a region R3, the segment of the regions 255 and 265 as a region R4, and the segment of the regions 256 and 266 as a region R5.

After dividing the user areas of the layers L0 and L1 into the regions R0 through R5, the recording and reproducing apparatus 31 formats the optical disk 33 by de-icing the divided regions successively, starting from the region R0 (i.e., regions 251 and 261) and ending with the region R5 (regions 256 and 266).

Figure 9:
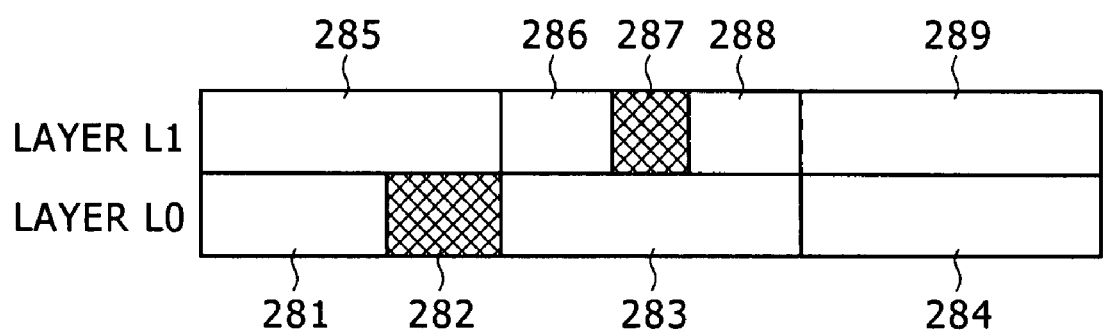
FIG. 9 is a schematic view explanatory of how a de-icing process is performed on the regions making up the user areas.

Illustratively, it is assumed that the direction from left to right as shown in FIG. 9 is the direction going from the radially innermost side to the radially outermost side of the optical disk 33. It is also assumed that the recording and reproducing apparatus 31 divides the user areas of the optical disk 33 into regions 281 through 289 and that a region R0-0 is formed by the regions 281 and 282, a region R1-0 by the region 283, a region R2-0 by the region 284, a region R0-1 by the region 285, a region R1-1 by the regions 286 through 288, and a region R2-1 by the region 289. In this case, as in the case of FIG. 8, the regions R0-0 and R0-1 will be referred to as the region R0, the regions R1-0 and R1-1 as the region R1, and the regions R2-0 and R2-1 as the region R2.

Illustratively, with data already written to the user areas of the optical disk 33 in response to a disk access request issued by the information processing apparatus 32 to the recording and reproducing apparatus 31, the recording and reproducing apparatus 31 de-ices a given region Rx ("x" is an integer) starting from its component region Rx (i.e., Rx-0 or Rx-1) in the recording layer different from the layer to which data was last written, followed by the component region Rx in the layer last written with data. That is, when de-icing the region Rx, the recording and reproducing apparatus 31 performs the de-icing process preferentially on the component layer Rx in the recording layer different from the layer L0 or L1 to which data was last written.

In the makeup of FIG. 9, data (dummy data or other data supplied by the information processing apparatus 32) has yet to be written to the regions 281, 283 through 286, 288, and 289, whereas the data supplied by the information processing apparatus 32 has been written in the regions 282 and 287. Suppose now that the region 282 is first written with the data followed by the region 287, i.e., that the data is last written to the region 287 on the optical disk 33. In that case, with the region 287 located in the user area of the layer L1, the recording and reproducing apparatus 31 first de-ices the component region Rx-0 of the region Rx in the layer L0 and then the component region Rx-1 in the layer L1

That is, the recording and reproducing apparatus 31 in the case above formats the optical disk 33 by writing dummy data to the regions 281, 285, 283, 286, 288, 284, and 289, in that order.

More specifically, if the optical disk 33 is an opposite type optical disk, the recording and reproducing apparatus 31 writes data to the user area of the layer L1 starting from the radially outermost side and going toward the radially innermost side of the disk. For example, when writing data to the region 285 in FIG. 9, the recording and reproducing apparatus 31 writes data from right to left. Alternatively, before writing data to the region 285, the recording and reproducing apparatus 31 may divide the region 285 into a predetermined number of component regions (i.e., in units of physical sectors). The data may then be written successively to the region 285 starting from the leftmost component region and ending in the rightmost component region. Each of the component regions is written with data from right to left.

Figure 10:
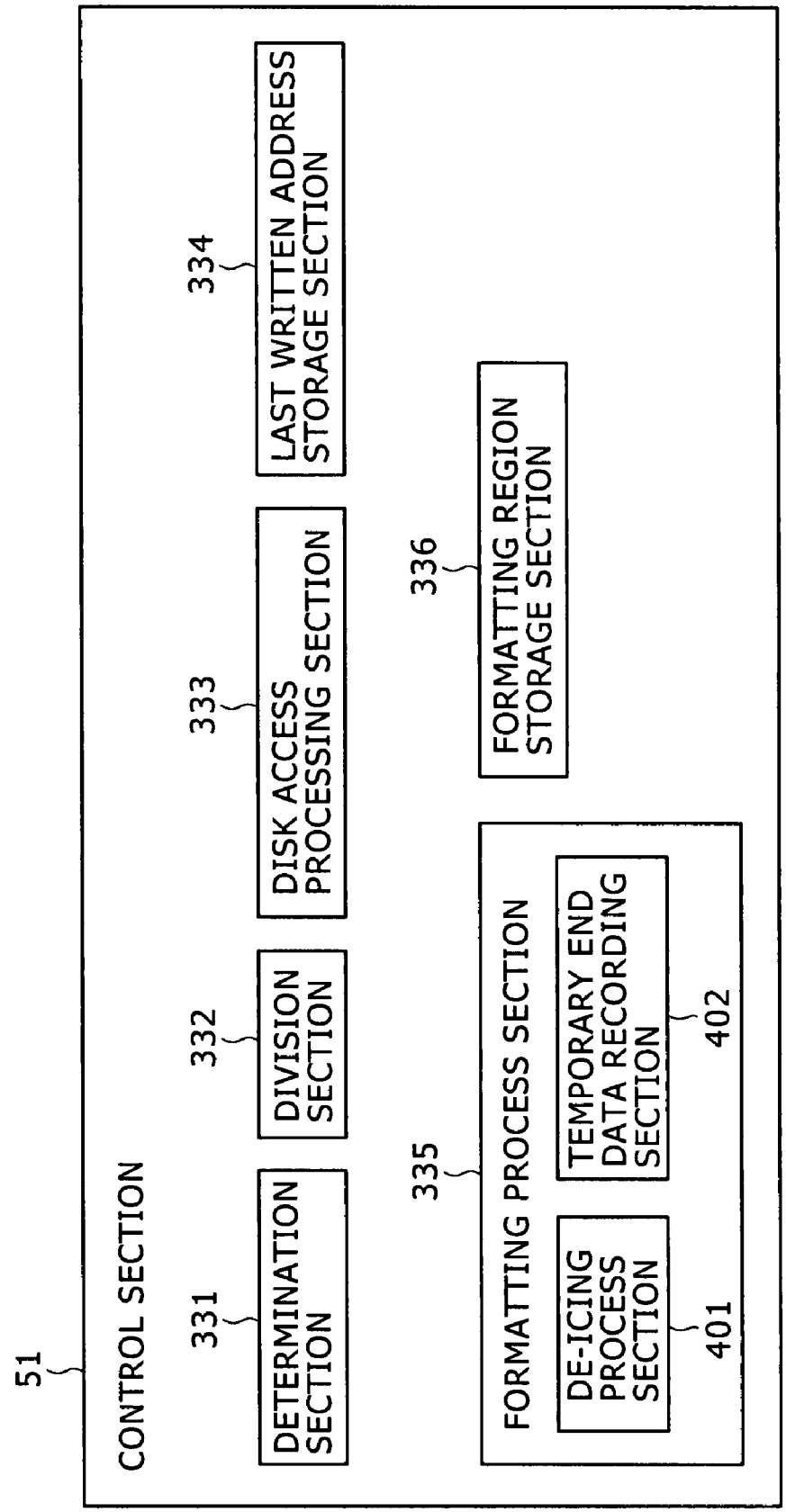
FIG. 10 is a block diagram showing a typical functional structure of a control section.

FIG. 10 is a block diagram showing a typical functional structure of the control section 51 included in the setup of FIG. 2. With this structure, the control section 51 carries out relevant programs so as to functionally implement a determination section 331, a division section 332, a disk access processing section 333, a last written address storage section 334, a formatting process section 335, and a formatting region storage section 336 as shown in FIG. 10.

The determination section 331 determines whether a disk access request or a disk unmount request has been received from the information processing apparatus 32. Given the result of the determination, the determination section 331 causes the relevant components of the control section 51 to carry out their processes accordingly. As needed, the determination section 331 checks to determine whether the user areas of the optical disk 33 have been fully or partially formatted, by referencing in the formatting region storage section 336 the information pointing to the next region to be formatted. Given the result of the check, the determination section 331 causes the relevant components of the control section 51 to perform their processes accordingly.

When the optical disk 33 is mounted on the recording and reproducing apparatus 31, the division section 332 divides the user areas of the mounted disk 33 into regions of a predetermined size each for control purposes.

When a disk access request comes from the information processing apparatus 32 through the signal processing section 56 (FIG. 2), the disk access processing section 333 controls the signal processing section 56 to carry out processing as requested (i.e., disk access process).

Illustratively, if the information processing apparatus 32 issues a disk access request to write data to the optical disk 33, the disk access processing section 333 writes to the optical disk 33 the data supplied by the information processing apparatus 32 to the signal processing section 56. In another example, if the information processing apparatus 32 issues a disk access request to read data from the optical disk 33, the disk access processing section 333 causes the signal processing section 56 to read the from those positions on the optical disk 33 which are designated by the disk access request and to send the retrieved data to the information processing apparatus 32.

Upon receipt of a disk access request from the information processing apparatus 32, the last written address storage section 334 stores the last written address (e.g., physical address) indicating that user area position of the optical disk 33 to which data was last written.

The formatting process section 335 causes the signal processing section 56 to write format information to the FDCB zone in the lead-in area of the optical disk 33. The formatting process section 335 further causes the signal processing section 56 to format predetermined regions of the user areas on the optical disk 33. The formatting process section 335 includes a de-icing process section 401 and a temporary end data recording control section 402.

As needed, the de-icing process section 401 in the formatting process section 335 references the last written address in the last written address storage section 334. Given the referenced last written address and in accordance with the result of the determination by the determination section 331, the de-icing process section 401 causes the signal processing section 56 to format predetermined regions of the users areas on the optical disk 33.

In the event of a disk unmount request getting issued by the information processing apparatus 32 via the signal processing section 56 halfway through the formatting of the user areas on the optical disk 33, the temporary end data recording control section 402 in the formatting process section 335 controls the signal processing section 56 to write temporary end data indicating that user area position on the optical disk 33 up to which data was recorded and at which the data recording has temporarily ended. Illustratively, the temporary end data recording control section 402 in the formatting process section 335 causes the signal processing section 56 to write a TLO area or a TMA to the user areas of the optical disk 33.

The formatting region storage section 336 stores information pointing to the region RX to be formatted next (i.e., region Rx to which to write dummy data) in the user areas of the optical disk 33. For example, at the time when the formatting of the optical disk 33 (i.e., background formatting) is to be started, the formatting region storage section 336 sets to R0 the region Rx to be formatted next. Every time the formatting of the region Rx is completed, the region number Rx is incremented by "1" to determine the region Rx to be formatted next. The region subsequent to the already formatted regions is established as the region Rx to be formatted next.

Figure 11:
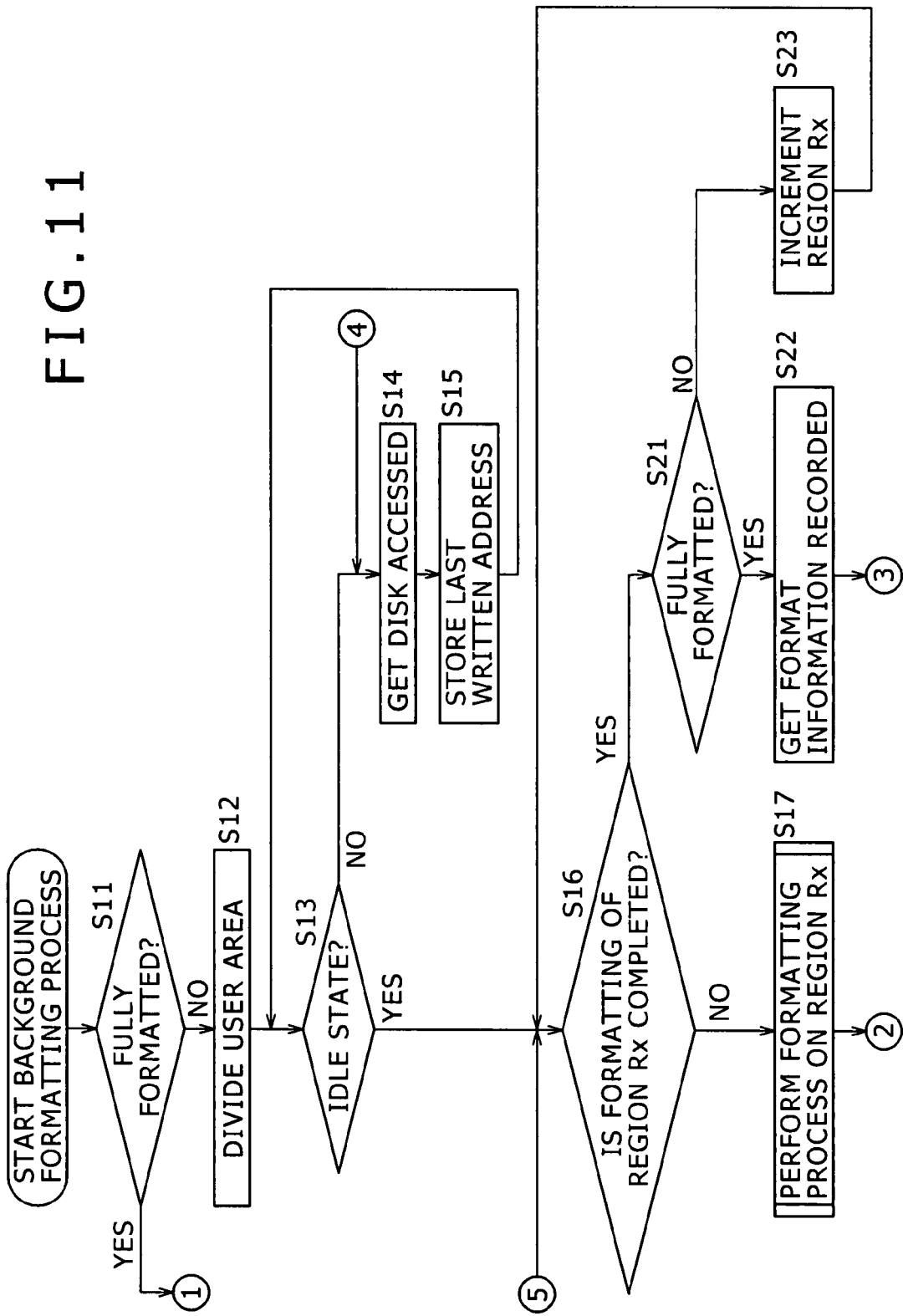
FIG. 11 is a flowchart of steps constituting part of a background formatting process.
Figure 12:
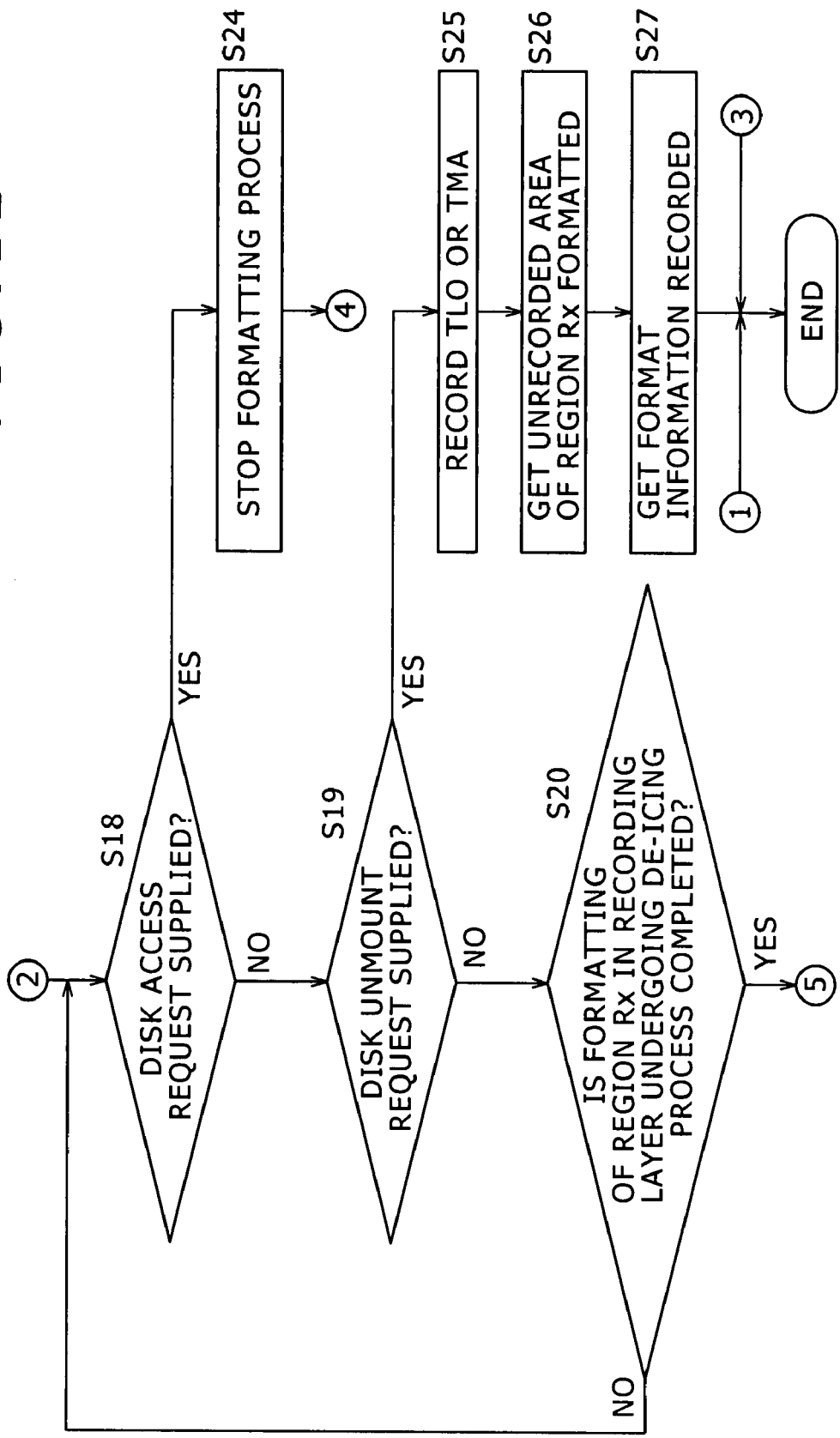
FIG. 12 is a flowchart of other steps constituting part of the background formatting process.

When a partially formatted optical disk 33 is mounted on the recording and reproducing apparatus 31 or when the optical disk 33 mounted on the recording and reproducing apparatus 31 has been partially formatted, the recording and reproducing apparatus 31 carries out background formatting. Described below in reference to the flowcharts of FIGS. 11 and 12 is a typical background formatting process carried out by the recording and reproducing apparatus 31.

In step S11, the determination section 331 checks to determine whether the optical disk 33 is fully formatted. Illustratively, the control section 51 in step S11 causes the signal processing section 56 to read formatting status information from the FDCB zone of the lead-in area on the optical disk 33 shown in FIG. 5, the information indicating how far the formatting has progressed.

In the case above, the reproduced signal processing section 71 generates a reproduced signal based on the electrical signal coming from the optical pickup 55, the reproduced signal being arranged to reproduce the data recorded on the optical disk 33. The reproduced signal processing section 71 subjects the reproduced signal thus generated to predetermined processing such as eight-sixteen demodulation in order to acquire data including the formatting status information. The data thus acquired is sent to the memory controller 72. In turn, the memory controller 72 supplies the control section 51 with the data received from the reproduced signal processing section 71.

The determination section 331 examines the data including the formatting status information supplied by the signal processing section 56. If the examined formatting status information, explained earlier in reference to FIG. 5, is found to be "10" or "11," that means the optical disk 33 was fully formatted either by the recording and reproducing apparatus 31 or by the manufacturer. If the formatting status information turns out to be "01," that means the optical disk 33 is a partially formatted disk and has yet to be fully formatted.

If in step S11 the optical disk 33 is found to be fully formatted, then the formatting of the optical disk 33 is already complete. The background formatting process is then brought to and end.

If in step S11 the optical disk 33 is not found to be fully formatted, then step S12 is reached. In step S12, the division section 332 divides the user areas of the optical disk 33 into regions of a predetermined size each. The divided regions are serially named R0 through Rx (x is an integer) ranging from the radially innermost side to the radially outermost side of the optical disk 33.

Illustratively, as discussed in FIG. 8, the division section 332 divides the user area of the layer L0 and that of the layer L1 at substantially the same physical positions for management purposes. More specifically, the division section 332 divides the user area of the layer L0 into regions 251 through 256 of a predetermined size each and names then as regions R0-0 through R5-0 respectively. Likewise, the division section 332 divides the user area of the layer L1 into regions 261 through 266 of the predetermined size each and names them as regions R0-1 through R5-1 respectively.

In step S13, the determination section 331 checks to determine whether the recording and reproducing apparatus 31 is in an idle state. That is, the determination section 331 in step S13 determines whether the information processing apparatus 32 has sent a disk access request to the control section 51 through the signal processing section 56.

If in step S13 the recording and reproducing apparatus 31 is not found to be in the idle state, i.e., if a disk access request is supplied from the information processing apparatus 32 to the control section 51, then step S14 is reached. In step S14, the disk access processing section 333 causes the signal processing section 56 to perform a disk access process.

Illustratively, if the information processing apparatus 32 supplies the control section 51 with a disk access request to write data to the optical disk 33, then the disk access processing section 333 causes the signal processing section 56 to write to the optical disk 33 the data that was sent from the information processing apparatus 32. In this case, the memory controller 72 sends to the recording signal processing section 75 the data supplied from the information processing apparatus 32 through the interface 74. The recording signal processing section 75 subjects the data coming from the memory controller 72 to predetermined processing such as eight-sixteen modulation thereby to acquire a recording signal. The recording signal thus acquired is fed to the optical pickup 55. Under control of the control section 51, the optical pickup 55 energizes its internal laser diode to emit light to the optical disk 33 in a manner reflecting the recording signal sent from the signal processing section 56, whereby the data of interest is written to the optical disk 33.

In another example, if the information processing apparatus 32 issues a disk access request to read data from the optical disk 33, the disk access processing section 333 causes the signal processing section 56 to read the data of interest from those user area positions on the optical disk 33 which have been designated by the disk access request, and to forward the retrieved data to the information processing apparatus 32.

In the above example, the reproduced signal processing section 71 generates a reproduced signal based on the electrical signal coming from the optical pickup 55, the reproduced signal being arranged to reproduce the data recorded on the optical disk 33. The reproduced signal processing section 71 subjects the reproduced signal thus generated to predetermined processing such as eight-sixteen demodulation thereby to acquire data. The data thus obtained is forwarded to the memory controller 72. In turn, the memory controller 72 supplies the data coming from the reproduced signal processing section 71 to the information processing apparatus 32 through the interface 74.

In step S15, the last written address storage section 334 stores the last written address (e.g., physical address) indicating that user area position of the optical disk 33 to which data was last written during the disk access process (of step S14). With the last written address thus stored, control is returned to step S13.

Illustratively, if data was last written to the region 253 shown in FIG. 8, then the last written address storage section 335 stores the last written address indicating the position of the region 253 (i.e., region R2-0 in the layer L0). More specifically, the disk access request might also involve reading data from the optical disk 33 during the disk access process. In such a case, step S15 is bypassed because no data is written to the optical disk 33.

If in step S13 the recording and reproducing apparatus 31 is found to be in an idle state, i.e., if no disk access request is being sent from the information processing apparatus 32 to the control section 51, then step S16 is reached. In step S16, based on the data from the signal processing section 56, the determination section 331 checks to determine whether the region Rx to be formatted next (i.e., targeted region Rx) as indicated by the information stored in the formatting region storage section 336 is fully formatted.

Illustratively, suppose that the region Rx to be formatted next is found to be the region R0 according to the information held in the formatting region storage section 336. In that case, the determination section 331 checks to see if the formatting of the user area of the layer 0 and that of the layer L1 (i.e., regions R0-0 and R0-1) is already completed.

If in step S16 the region Rx is not found to be fully formatted, then step S17 is reached. In step S17, the control section 51 formats the region Rx. As will be described later in more detail, the control section 51 controls the signal control section 56 to format the region Rx-0 of the layer L0 or the region Rx-1 of the layer L1 through the de-icing process.

In step S18, the determination section 331 checks to determine whether a disk access request is supplied from the information processing apparatus 32 to the control section 51 through the signal processing section 56.

If in step S18 the disk access request is not found to be supplied, then step S19 is reached. In step S19, the determination section 331 checks to determine whether the information processing apparatus 32 has supplied a disk unmount request to the control section 51 through the signal processing section 56.

If in step S19 the disk unmount request is not found to be supplied, then step S20 is reached. In step S20, the determination section 331 checks to determine whether the formatting of the region Rx being de-iced in the recording layer is completed. For example, suppose that in step S17, the region 253 shown in FIG. 8 (i.e., region R2-0 in the layer L0) is formatted. In such a case, the determination section 331 in step S20 checks to determine whether the formatting of the region R2-0 in the layer L0 is completed.

If in step S20 the formatting of the region Rx being de-iced in the recording layer is not found to be completed, then step S18 is reached again and the subsequent steps are repeated. In this case, the control section 51 continues formatting the region Rx by carrying out the de-icing process on the region in question.

If in step S20 the formatting of the region Rx being de-iced in the recording layer is found to be completed, that means the region Rx has been de-iced in the recording layer and that the next region is ready to be formatted. In that case, step S16 is reached again and the subsequent steps are repeated.

If in step S16 the formatting of the region Rx is found to be completed, then step S21 is reached. In step S21, the determination section 331 checks to determine whether the optical disk 33 is fully formatted.

If in step S21 the optical disk 33 is found to be fully formatted, then step S22 is reached. In step S22, the formatting process section 335 controls the signal processing section 56 to write format information to the FDCB zone in the lead-in area of the optical disk 33 before terminating the background formatting process.

Illustratively, the formatting process section 335 causes the signal processing section 56 to write "10" as formatting status information constituting part of the FDCB zone, as explained above in reference to FIG. 5, the information indicating that the optical disk 33 has been fully formatted by the recording and reproducing apparatus 31.

Illustratively, in step S22, the formatting process section 335 supplies the signal processing section 56 with the data containing the format information to be written to the optical disk 33. The memory controller 72 forwards the data coming from the control section 51 to the recording signal processing section 75. The recording signal processing section 75 subjects the data from the memory controller 72 to predetermined processing such as eight-sixteen modulation so as to acquire a recording signal. The recording signal thus obtained is sent to the optical pickup 55. Under control of the control section 51, the optical pickup 55 energizes its internal laser diode to emit light to the optical disk 33 in a manner reflecting the recording signal received from the signal processing section 56. This allows the format information such as that shown in FIG. 5 to be written to the FDCB zone in the lead-in area on the optical disk 33.

If in step S21 the optical disk 33 is not found to be fully formatted, then step S23 is reached. In step S23, the formatting region storage section 336 increments by "1" the region number Rx for the region to be formatted next (i.e., targeted region Rx) as indicated by the information stored in the section 336. Control is then returned to step S16. Illustratively, suppose that the region Rx to be formatted next is found to be the region R0 according to the information held in the formatting region storage section 336. In that case, the formatting region storage section 336 sets to R1 the region number Rx for the region to be formatted next.

If in step S18 the disk access request is found to be supplied, then step S24 is reached. In step S24, the formatting process section 335 causes the signal processing section 56 to stop formatting the region Rx halfway to let the disk access process be carried out. Control is then returned to step S14.

If in step S19 the disk unmount request is found to be supplied, then step S25 is reached so that the optical disk 33 may be ejected from the recording and reproducing apparatus 31. In step S25, the temporary end data recording control section 402 in the formatting process section 335 controls the signal processing section 56 to write a TLO area or a TMA to the user areas of the optical disk 33.

Illustratively, if the optical disk 33 is a parallel type optical disk in the state of FIG. 6A, then the temporary end data recording control section 402 in the formatting process section 335 controls the signal processing section 56 to write a TLO area to the region 149 in the layer L1 and another TLO area to the region 150 in the layer L0 on the disk 33 as shown in FIG. 6B. In this case, the temporary end data recording control section 402 in the formatting process section 335 supplies the signal processing section 56 with the data (i.e., TLO) to be written to the regions 149 and 150. The memory controller 72 forwards the data coming from the control section 51 to the recording signal processing section 75. The signal processing section 75 in turn subjects the data from the memory controller 72 to predetermined processing such as eight-sixteen modulation to acquire a recording signal. The recording signal thus obtained is sent to the optical pickup 55. Under control of the control section 51, the optical pickup 55 energizes its internal laser diode to emit light to the optical disk 33 in a manner reflecting the recording signal from the signal processing section 56, thereby writing the data to the regions 149 and 150. If the optical disk 33 is an opposite type optical disk, then the temporary end data recording control section 402 in the formatting process section 335 controls the signal processing section 56 to write TMAs to the user areas of the optical disk 33.

In step S26, the de-icing process section 401 in the formatting process section 335 controls the signal processing section 56 to format the unrecorded portion of the region Rx subject to formatting. Illustratively, if the region Rx-0 in the layer L0 is being formatted and if the formatting of the region Rx-1 in the layer L1 has yet to be completed, the de-icing process section 401 in the formatting process section 335 controls the signal processing section 56 to write dummy data to those portions of the regions Rx in the layers L0 and L0 which have yet to be written with data (or dummy data) for formatting purposes.

Illustratively, suppose that as shown in FIG. 6B, the region 151 is an unrecorded region (i.e., a yet-to-be formatted region) in the user area 145 between the lead-in area 141 and the TLO area 150 and that the user area 147 has been formatted between the lead-in area 143 and the TLO area 149. In such a case, the de-icing process section 401 in the formatting process section 335 controls the signal processing section 56 to write dummy data to the unrecorded region 151.

In step S27, the formatting process section 335 controls the signal processing section 56 to write format information to the FDCB zone in the lead-in area of the optical disk 33, before terminating the background formatting process. Illustratively, the formatting process section 335 causes the signal processing section 56 to write the format information shown in FIG. 5 to the FDCB zone in the lead-in area of the optical disk 33. With the format information written to the FDCB zone on the optical disk 33, the control section 51 controls the relevant components of the recording and reproducing apparatus 31 to eject the optical disk 33.

In the manner described above, the recording and reproducing apparatus 31 first divides the user areas of the optical disk 33 into regions of a predetermined size each. The recording and reproducing apparatus 31 then performs de-icing processes on the user area of the layer L0 and that of the layer L1 in parallel, thereby formatting the optical disk 33 (in a background formatting process).

Because the de-icing process on the user area in the layer L0 is carried out in parallel with the de-icing process on the user area in the layer L1 during the formatting of the optical disk 33, a disk unmount request issued by the information processing apparatus 32 halfway through the background formatting of the disk 33 causes significantly smaller areas to be written with dummy data than if the de-icing is not parallelly performed. This makes it possible to eject the optical disk 33 more quickly than before.

If a disk unmount request is issued by the information processing apparatus 32 to the recording and reproducing apparatus 31 during the background formatting process on the two-layer optical disk 33, a temporary lead-out (TLO) area or a temporary middle area (TMA) is created where appropriate in each of the user areas of the layers L0 and L1, and dummy data is written to any unrecorded regions between the lead-in area and the TLO or TMA. It follows that even if the background formatting of the optical disk 33 has yet to be completed by the recording and reproducing apparatus 31 upon disk ejection, the ejected disk 33 is fully formatted in a simulated manner. This enables the reproducing apparatus with no recording means to reproduce data from the optical disk 33 yet to be fully formatted in actuality.

Figure 13:
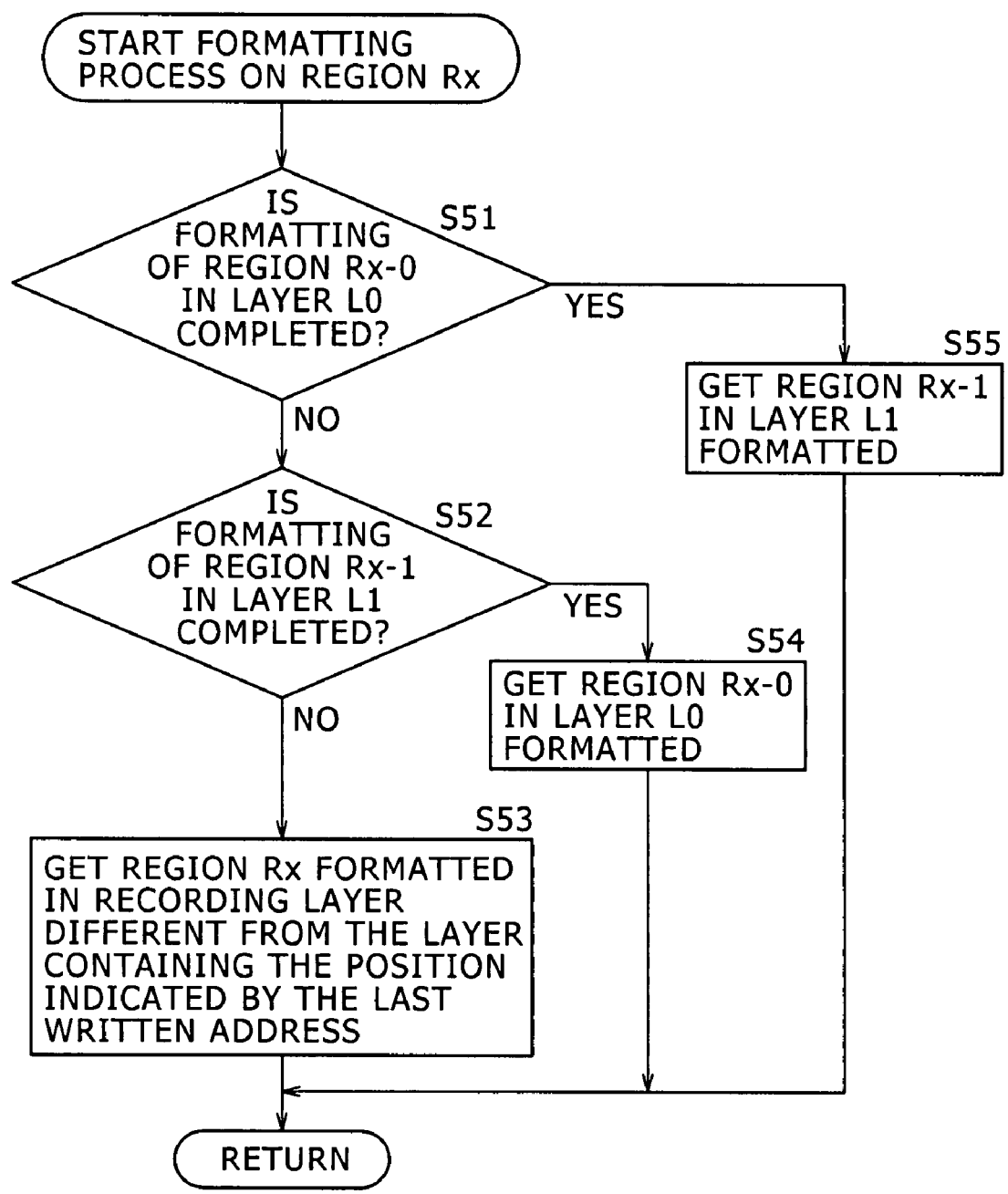
FIG. 13 is a flowchart of steps constituting a formatting process performed on a region Rx.

Described below in reference to the flowchart of FIG. 13 is a typical formatting process performed on the region Rx. This process corresponds to step S17 in FIG. 11.

In step S51, based on the data coming from the signal processing section 56, the determination section 331 checks to determine whether the formatting of the region Rx-0 in the layer L0 is completed among the regions Rx indicated as the next regions to be formatted by the information stored in the formatting region storage section 336. Illustratively, if the region R0 is indicated as part of the regions Rx to be formatted next according to the stored information, then the determination section 331 checks to see if the formatting of the region R0-0 in the layer L0 is completed.

If in step S51 the region Rx-0 in the layer L0 is not found to be fully formatted, then step S52 is reached. In step S52, based on the data coming from the signal processing section 56, the determination section 331 checks to determine whether the formatting of the region Rx-1 in the layer L1 is completed among the regions Rx indicated as the next regions to be formatted by the information stored in the formatting region storage section 336.

If in step S52 the region Rx-1 in the layer L1 is not found to be fully formatted, i.e., if the formatting of the regions Rx in the layers L0 and L1 (i.e., regions Rx-0 and Rx-1) is not complete, then step S53 is reached. In step S53, the de-icing process section 401 in the formatting process section 335 controls the signal processing section 56 to format the region Rx in the recording layer different from the layer including the position (in the recordable user area) indicated by the last written address held in the last written address storage section 334, before terminating the formatting process. If the last written address storage section 334 does not store any last written address, i.e., if the optical disk 33 is not written with any data (not recorded by any disk access process) other than dummy data, then the de-icing process section 401 in the formatting process section 335 formats the region Rx in the predetermined recording layer (layer L0 or L1).

Illustratively, suppose that in the makeup of FIG. 9, the region R0-0 is formed by the regions 281 and 282, the region R0-1 by the region 285, and the region R0 by the regions 281, 282 an 285; and that the region 287 is in the position indicated by the last written address and the region R0 is the region to be formatted next according to the information indicative of the regions targeted to be formatted next. In that case, the de-icing process section 401 in the formatting process section 335 controls the signal processing section 56 to format preferentially the region R0-0 in the layer L0 different from the layer L1 containing the region 287.

In the above example, the de-icing process section 401 in the formatting process section 335 acquires dummy data illustratively from the work memory 52 and supplies the acquired data to the signal processing section 56. The memory controller 72 forwards the dummy data coming from the control section 51 to the recording signal processing section 75. In turn, the recording signal processing section 75 subjects the dummy data from the memory controller 72 to predetermined processing such as eight-sixteen modulation to obtain a recording signal. The recording signal thus acquired is sent to the optical pickup 55. Under control of the control section 51, the optical pickup 55 energizes its internal laser diode to emit light to the optical disk 33 in a manner reflecting the recording signal supplied by the signal processing section 56. Dummy data is thus written to the unrecorded region 281 in the region R0-0 of the layer L0, whereby the region R0-0 is formatted. The region 282 in the layer L0 already has data recorded therein and will not be written with dummy data.

If in step S52 the formatting of the region Rx-1 in the layer L1 is found to be completed, i.e., if the region Rx-1 in the layer L1 is fully formatted but the region Rx-0 in the layer L0 has yet to be formatted, then step S54 is reached. In step S54, the de-icing process section 401 in the formatting process section 335 controls the signal processing section 56 to format the region Rx-0 in the layer L0, before terminating the formatting process.

If in step S51 the formatting of the region Rx-0 in the layer L0 is found to be completed, i.e., if the region Rx-0 in the layer L0 is fully formatted but the region Rx-1 in the layer L1 has yet to be formatted, then step S55 is reached. In step S55, the de-icing process section 401 in the formatting process section 335 controls the signal processing section 56 to format the region Rx-1 in the layer L1, before terminating the formatting process.

It might happen that the region Rx in the recording layer about to be formatted is the last region to be formatted, i.e., that formatting the region Rx in the recording layer of interest will complete the formatting of the optical disk 33. In such a case, the de-icing process section 401 in the formatting process section 335 controls the signal processing section 56 to format the region Rx of the recording layer in question, before creating a lead-out area or a middle area by writing necessary information to the region adjacent to the user area and radially outside thereof.

Suppose now that in the makeup of FIG. 9, all regions except for the region 284 have been fully formatted. In that case, the formatting process section 335 first completes the formatting of the region 284 and then controls the signal processing section 56 to create a lead-out area or a middle area by writing necessary data to the radially outermost regions of the layers L0 and L1. At this point, the optical disk 33 is fully formatted.

As described above, the recording and reproducing apparatus 31 formats the regions Rx by referencing as needed the last written address stored in the last written address storage section 334. Illustratively, if only one of the region Rx-0 in the layer L0 and the region Rx-1 in the layer L1 has been fully formatted, the recording and reproducing apparatus 31 proceeds to format the other region Rx in the other recording layer (region R0-0 or R0-1). If both of the region Rx-0 in the layer L0 and the region Rx-1 in the layer L1 have yet to be formatted, the recording and reproducing apparatus 31 preferentially formats the region Rx in the recording layer different from the layer containing the position indicated by the last written address that may be referenced in the last written address storage section 334.

When supplying the recording and reproducing apparatus 31 with a disk access request to write data to the optical disk 33, the information processing apparatus 32 designates the position from which to start writing data and the length of data to be transferred through the use of the same disk access request. Depending on the application program run by the information processing apparatus 32, the data constituting movies (moving image data) is most often written sequentially to the user areas of the optical disk 33. This type of data recording is preferred in order to minimize the time of access to the optical disk 33, whereby seamless data reproduction is implemented.

It follows that if moving image data is written to the region 253 in the layer L0 as shown in FIG. 8, it is more than probable that the next position to be written with data is the region 254 adjacent to the region 253 in the layer L0. With the last written address stored and with the recording and reproducing apparatus 31 in an idle state, both of the regions Rx in the layers L0 and L1 may turn out to be unformatted. In that case, the recording and reproducing apparatus 31 preferentially formats the region Rx in the recording layer different from the layer containing the position indicated by the last written address. This lowers the possibility that the region Rx in the recording layer including the position indicated by the last written address is found formatted upon resumption of data recording to the user areas.

Suppose that the recording and reproducing apparatus 31 is placed in an idle sate, with the last written address pointing to the region 253 in the layer L0 as shown in FIG. 8. In such a case, the recording and reproducing apparatus 31 preferentially formats the layer L1 different from the layer L0 containing the region 253 indicated by the last written address. Illustratively, the recording and reproducing apparatus 31 may enter an idle state and perform a formatting process (de-icing process) starting from the region 264 in the layer L1, whereupon a disk access request may be issued to resume the writing of data before the formatting of the region 264 is complete. At this point, the region 254 adjacent to the region 253 last written with dummy data has yet to be formatted and has no dummy data recorded therein. In this case, as discussed above, it is highly probable that data will be written to the region 254. Since no dummy data is currently written in the region 254, the number of times the region 254 is overwritten with dummy data can be reduced. This in turn contributes to suppressing the degradation of recording regions caused by the repeated overwriting of data to the optical disk 33.

In the above example, it was shown that with the last written address stored, the region Rx is formatted preferentially in the recording layer different from the layer containing the position indicated by the last written address. Alternatively, the last written address may be stored for each region Rx and may be referenced so as to let each region Rx be formatted preferentially in the recording layer different from the layer including the position indicated by the last written address in question. This modification further inhibits the degradation of the recordable regions on the optical disk.

In the preceding example, the last written address storage section 334 stores the last written address for each of the regions Rx involved as shown in FIG. 14. FIG. 14 lists the regions Rx of user areas in association with corresponding last written addresses (e.g., physical addresses) each pointing to the position where data was last written in the region Rx in question.

Illustratively, the last written address storage section 334 stores a last written address "Layer L0, 3000" pointing to the position where data was last written in the region R0. Specifically, the last written address "Layer L0, 3000" indicates that the data last written to the region R0 resides in the position designated by physical address "3000" pointing to the region R0-0 in the layer L0.

As with the region R0, the last written address storage section 334 stores a last written address "Layer L1, 5000" pointing to the position where data was last written in the region R1, and a last written address "Layer L0, 6000" pointing to the position where data was last written in the region R2.

In that case, the recording and reproducing apparatus 31 may format the optical disk 33 starting from the region R0 followed by the regions R1 and R2, in that order. With the last written address for the region R0 given as "Layer L0, 3000," the recording and reproducing apparatus 31 first formats the region R0-1 in the layer L1 and then the region R0-0 in the layer L0. With the last written address for the region R1 given as "Layer L1, 5000," the recording and reproducing apparatus 31 then formats the region R1-0 in the layer L0 followed by the region R1-1 in the layer L1. With the last written address for the region R2 given as "Layer L0, 6000," the recording and reproducing apparatus 31 proceeds to format the region R2-1 in the layer L1 followed by the region R2-0 in the layer L0. If both of the region Rx in the layer L0 and that in the layer L1 have yet to be formatted, then the recording and reproducing apparatus 31 may first format the region Rx in a predetermined recording layer (e.g., layer L0). Alternatively, the recording and reproducing apparatus 31 may initially format the region Rx in the recording layer different from the layer including the position indicated by the last written address for the region R(x-1).

Figure 15:
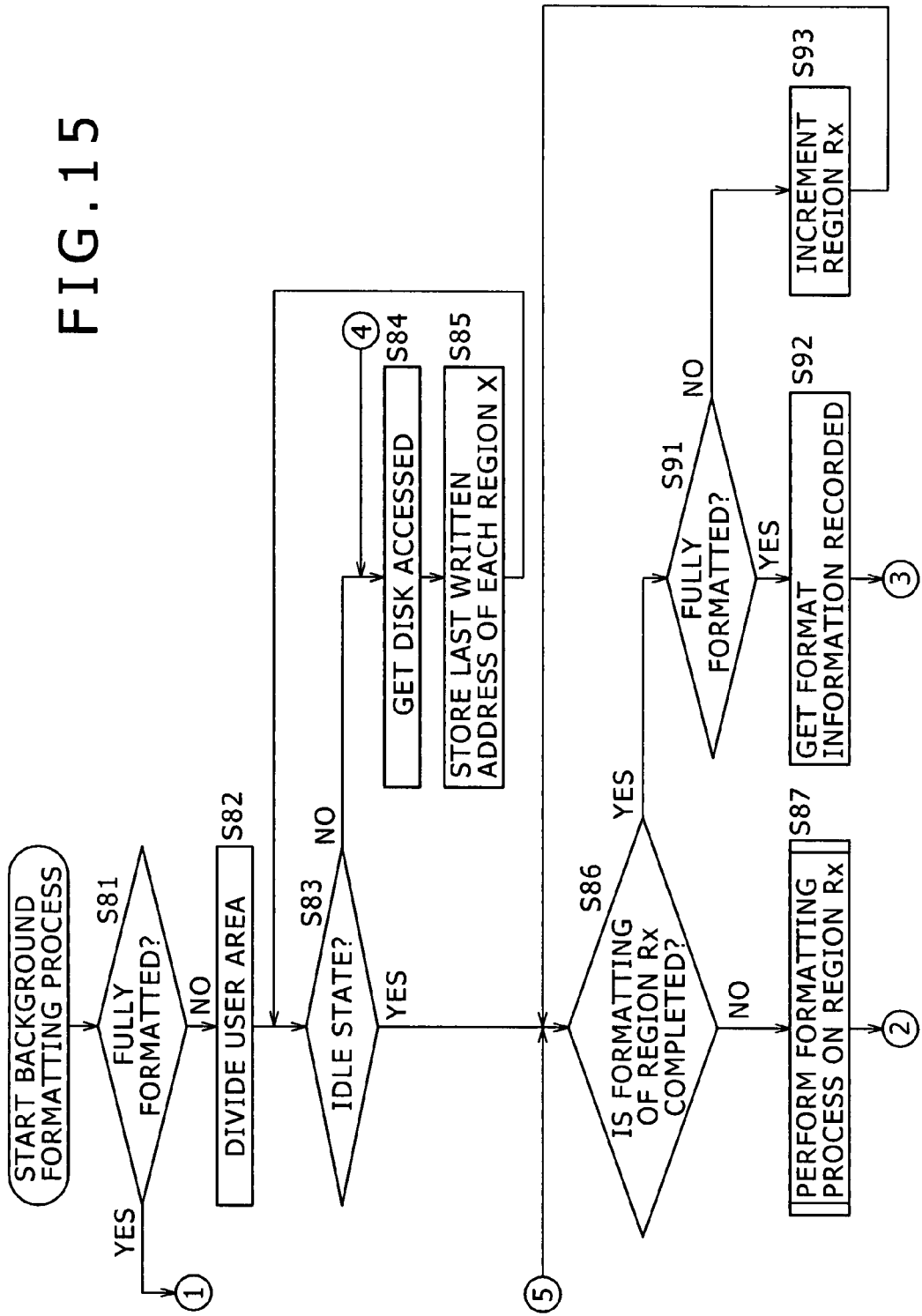
FIG. 15 is a flowchart of other steps constituting part of the background formatting process.
Figure 16:
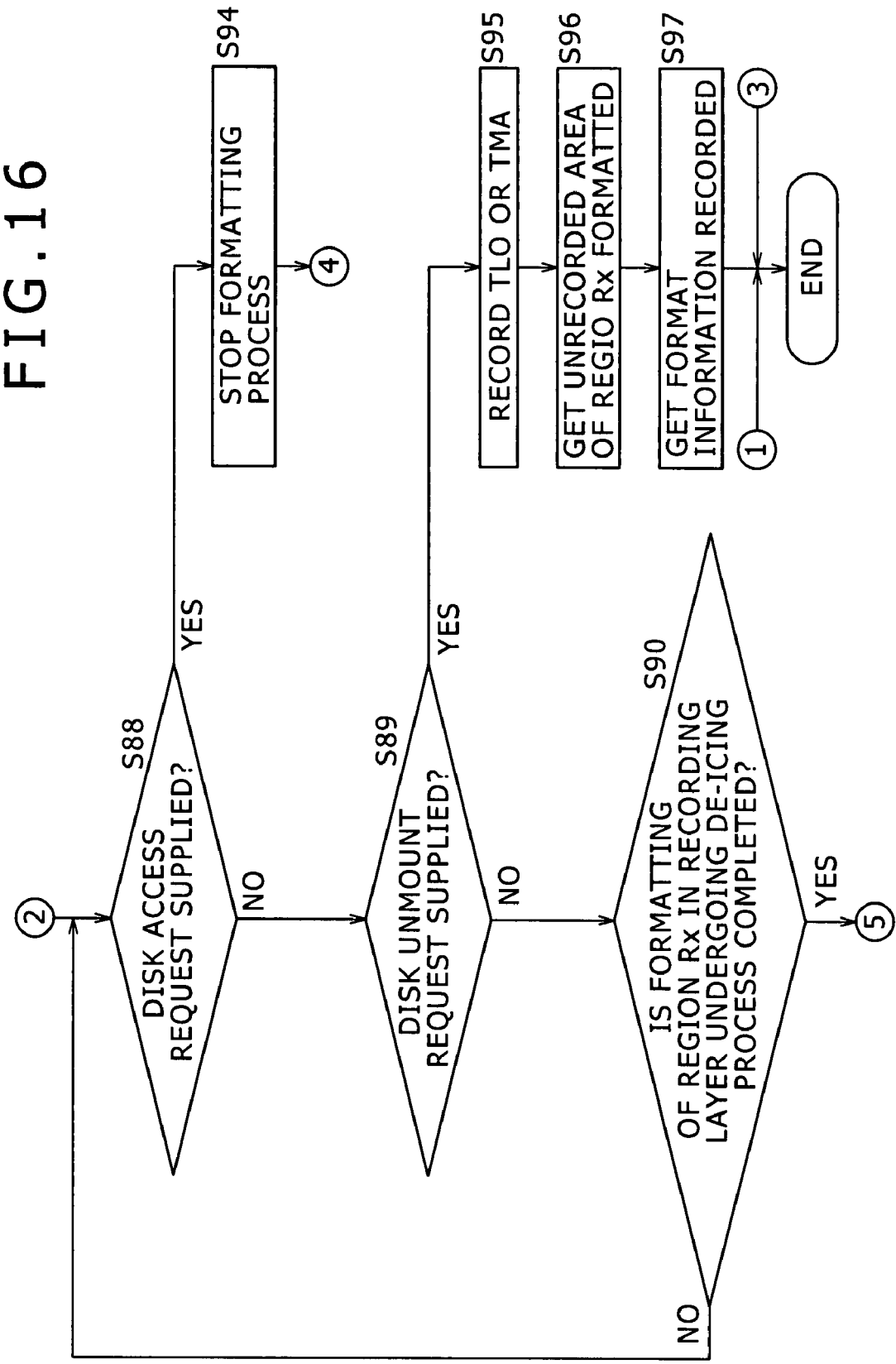
FIG. 16 is a flowchart of other steps constituting part of the background formatting process.

Described below in reference to the flowcharts of FIGS. 15 and 16 is a typical background formatting process performed by the recording and reproducing apparatus 31 wherein the last written address storage section 334 stores the last written address for each of the regions Rx involved.

This background formatting process is started if a partially formatted optical disk 33 is mounted on the recording and reproducing apparatus 31 or if the optical disk 33 mounted on the recording and reproducing apparatus 31 has been partially formatted. Steps S81 through S84 are the same as steps S11 through S14 described above in reference to FIG. 11 and thus will not be discussed further.

In step S84, the disk access processing section 333 controls the signal processing section 56 to effect a disk access process for writing data to the optical disk 33. In step S85, with the disk access process underway (following step S84), the last written address storage section 334 stores the last written address (e.g., physical address) pointing to the user area position to which data was last written in the user areas of the optical disk 33. Control is then returned to step S83.

Illustratively, suppose that the last written address storage section 334 stores the last written address for each of the regions Rx listed in FIG. 14 and that with the disk access process in progress (following step S84), the recording and reproducing apparatus 31 writes data to the position designated by physical address "5000" in the region R1 of the layer L1. In such a case, the last written address storage section 334 stores "Layer L1, 5000" as the last written address for the region R1.

More specifically, it might also happen that only data is read from the optical disk 33 in response to a disk access request demanding retrieval of recorded data from the disk 33. In such a case, step S85 is bypassed because no data is written to the optical disk 33.

If in step S83 the recording and reproducing apparatus 31 is found to be in an idle state, i.e., if no disk access request is being sent from the information processing apparatus 32 to the control section 51, then step S86 is reached. Step S86 and steps S88 through S97 are the same as step S16 and steps S18 through S27 in FIGS. 11 and 12 respectively, and thus will not be described further.

In step S87, the control section 51 formats the region Rx as will be discussed later in more detail. Upon formatting the region Rx, the control section 51 may as needed reference the last written address for each region Rx stored in the last written address storage section 334 and may accordingly control the signal control section 56 to carry out a de-icing process. Performing this process formats the region Rx-0 in the layer L0 or the region Rx-1 in the layer L1.

When writing data to the optical disk 33 through the disk access process as described above, the recording and reproducing apparatus 31 stores the last written address for each region Rx in the user areas.

Figure 17:
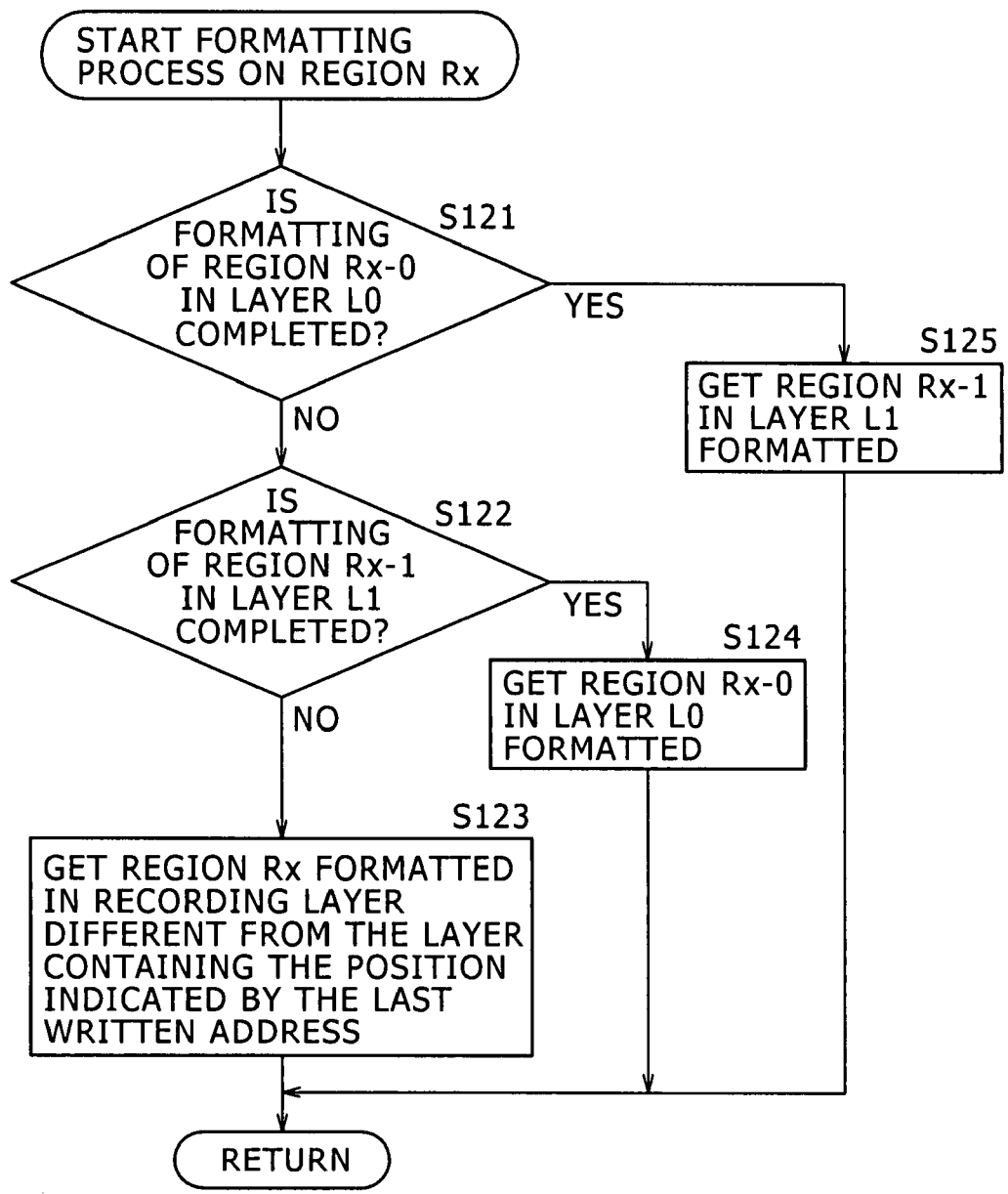
FIG. 17 is a flowchart of steps constituting a formatting process performed on a region Rx.

Described below in reference to the flowchart of FIG. 17 is a typical formatting process performed on the region Rx. The process corresponds to step S87 in FIG. 15. Steps S121, S122, S124 and S125 in FIG. 17 are the same as steps S51, S52, S54 and S55 in FIG. 13 respectively and thus will not be discussed further.

If in step S122 the formatting of the region Rx-1 in the layer L1 is not found to be complete, i.e., if the formatting of the regions Rx in the layers L0 and L1 (regions Rx-0 and Rx-1) has yet to be completed, then step S123 is reached. In step S123, the de-icing process section 401 in the formatting process section 335 controls the signal processing section 56 to format the region Rx in the recording layer different from the layer containing the position (in recordable user areas) indicated by the last written address for the region Rx stored in the last written address storage section 334, before terminating the formatting process. If the last written address storage section 334 does not store any last written address, i.e., if the region Rx in the layer L0 or L1 is not written with any data (through a disk access process) other than dummy data, then the de-icing process section 401 in the formatting process section 335 formats the region Rx in a predetermined recording layer (layer L0 or L1).

Illustratively, suppose that in the makeup of FIG. 9, the region R0-0 is formed by the regions 281 and 282, the region R0-1 by the region 285, and the region R0 by the regions R0-0 and R0-1; that the region 282 is in the position indicated by the last written address for the region R0; and that the region R0 constitutes the region Rx to be formatted next according to the information indicative of the regions targeted to be formatted next. In that case, the de-icing process section 401 in the formatting process section 335 controls the signal processing section 56 to format preferentially the region R0-1 (region 285) in the layer L1 different from the layer L0 containing the region 282.

As described, the recording and reproducing apparatus 31 formats the region Rx by referencing as needed the last written address for each region Rx in the last written address storage section 334. Illustratively, if only one of the region Rx-0 in the layer L0 and of the region Rx-1 in the layer L1 has been fully formatted, the recording and reproducing apparatus 31 proceeds to format the other region Rx in the other recording layer. If both of the region Rx-0 in the layer L0 and the region Rx-1 in the layer L1 have yet to be formatted, the recording and reproducing apparatus 31 preferentially formats the region Rx in the recording layer different from the layer containing the position indicated by the last written address for each region Rx that may be referenced in the last written address storage section 334.

As described, the last written address is stored for each region, and the region Rx is formatted preferentially in the recording layer different from the layer containing the position indicated by the last written address for the region Rx in question. This lowers the possibility that the region Rx in the recording layer including the position indicated by the last written address is found formatted upon resumption of data recording to the user areas. That in turn contributes to suppressing the degradation of recording regions caused by the repeated overwriting of data to the optical disk 33.

According to the present invention, as described above, if a disk unmount request is issued halfway through the background formatting process performed on the two-layer optical disk, a temporary lead-out (TLO) area or a temporary middle area (TMA) is created where appropriate in each of the user areas of the layers L0 and L1. Dummy data is then written to unrecorded regions between the lead-in area and the TLO area or TMA. This enables the recording and reproducing apparatus 31 to eject the optical disk 33 of which the background formatting is not complete but which has been fully formatted in a simulated manner. A reproducing apparatus with no recording means can then reproduce data from this type of optical disk 33 that has yet to be fully formatted in actuality.

Also according to the present invention, the de-icing process on the user area in the layer L0 is carried out in parallel with the de-icing process on the user area in the layer L1 during the formatting of the optical disk 33. It follows that a disk unmount request issued during background formatting of the two-layer optical disk causes significantly smaller areas to be written with dummy data than if the de-icing is not parallelly performed. This makes it possible to eject the optical disk halfway through the formatting more quickly than before.

The series of steps and processes described above may be executed either by hardware or by software. For the software-based processing to take place, the programs constituting the software may be either read from the optical disk 33 by the optical pickup 55 and sent from there to the work memory 52 for storage therein through the signal processing section 56 and control section 51, or sent by the information processing apparatus 32 to the work memory 52 for storage via the signal processing section 56 and control section 51.

In this specification, the steps which describe the programs stored on the recording medium represent not only the processes that are to be carried out in the depicted sequence (i.e., on a time series basis) but also processes that may be performed parallelly or individually and not chronologically.

The invention claimed is:

1. A recording apparatus for writing data to a data recording medium having at least two rewritable recording layers, said recording apparatus comprising:

division management means for dividing for management purposes a recording area of a first recording layer of said data recording medium into a plurality of first recording regions and a recording area of a second recording layer of the same medium into a plurality of second recording regions at substantially the same physical positions as said first recording regions;

recording control means for controlling data recording to said data recording medium in such a manner that if one of said first regions targeted to be written with first data for formatting or one of said second regions in substantially the same position as the first region has an unrecorded sector devoid of said first data or of second data designated by a user, then said first data is written to an unrecorded sector in the first region of interest or in the second region which has a same physical position as the first region; said recording control means further controlling the data recording in such a manner that if said first data or said second data is written to said first region or said second region thus eliminating the unrecorded sector from said first or said second region and if an unrecorded sector is detected in said first or said second region different from a respective region from which the unrecorded sector has been eliminated, then said first data is written to the detected unrecorded sector; and storage means for storing information for determining the position to which said second data was last written, wherein, if an unrecorded sector is detected in any one of all said first regions in said first recording layer and in the second region at substantially the same position as the first region of interest in said second layer, then said recording control means controls the data recording to said data recording medium in such a manner that writing of said first data is started with priority by said first data being written to the unrecorded sector in said first or said second region in the recording layer which is different from the recording layer having the region to which said second data was last written as determined by said information.

2. The recording apparatus according to claim 1, wherein, if no unrecorded sector is detected in said first region of interest and in said second region at substantially the same physical position as said first region, or if said first or said second data is written to the unrecorded sector in said first region of interest or in said second region at substantially the same physical position as said first region thus eliminating the unrecorded region from said targeted first region or said second region, then said recording control means gains access to another first region and another second region next to the currently handled first and second regions, and writes said first data to any unrecorded sector in the newly accessed first and second regions.

3. A recording method for writing data to a data recording medium having at least two rewritable recording layers, said recording method comprising the steps of:

dividing for management purposes a recording area of a first recording layer of said data recording medium into a plurality of first recording regions and a recording area of a second recording layer of the same medium into a plurality of second recording regions at substantially the same physical positions as said first recording regions;

controlling data recording to said data recording medium in such a manner that if one of said first regions targeted to be written with first data for formatting or one of said second regions in substantially the same position as the first region has an unrecorded sector devoid of said first data or of second data designated by a user, then said first data is written to an unrecorded sector in the first region of interest or in the second region which has a same physical position as the first region; said controlling step further controlling the data recording in such a manner that if said first data or said second data is written to said first region or said second region thus eliminating the unrecorded sector from said first or said second region and if an unrecorded sector is detected in said first or said second region different from a respective region from which the unrecorded sector has been eliminated, then said first data is written to the detected unrecorded sector; and storing information for determining the position to which said second data was last written, wherein, if an unrecorded sector is detected in any one of all said first regions in said first recording layer and in the second region at substantially the same position as the first region of interest in said second layer, then the controlling step controls the data recording to said data recording medium in such a manner that writing of said first data is started with priority by said first data being written to the unrecorded sector in said first or said second region in the recording layer which is different from the recording layer having the region to which said second data was last written as determined by said information.

4. A non-transitory computer readable recording medium having stored thereon a program for causing a computer to write data to a data recording medium having at least two rewritable recording layers, said program comprising the steps of:

dividing for management purposes a recording area of a first recording layer of said data recording medium into a plurality of first recording regions and a recording area of a second recording layer of the same medium into a plurality of second recording regions at substantially the same physical positions as said first recording regions;

controlling data recording to said data recording medium in such a manner that if one of said first regions targeted to be written with first data for formatting or one of said second regions in substantially the same position as the first region has an unrecorded sector devoid of said first data or of second data designated by a user, then said first data is written to an unrecorded sector in the first region of interest or in the second region which has a same physical position as the first region; said controlling step further controlling the data recording in such a manner that if said first data or said second data is written to said first region or said second region thus eliminating the unrecorded sector from said first or said second region and if an unrecorded sector is detected in said first or said second region different from a respective region from which the unrecorded sector has been eliminated, then said first data is written to the detected unrecorded sector; and storing information for determining the position to which said second data was last written, wherein, if an unrecorded sector is detected in any one of all said first regions in said first recording layer and in the second region at substantially the same position as the first region of interest in said second layer, then the controlling step controls the data recording to said data recording medium in such a manner that writing of said first data is started with priority by said first data being written to the unrecorded sector in said first or said second region in the recording layer which is different from the recording layer having the region to which said second data was last written as determined by said information.

5. A recording apparatus for writing data to a data recording medium having at least two rewritable recording layers, said recording apparatus comprising:

a division management section to divide for management purposes a recording area of a first recording layer of said data recording medium into a plurality of first recording regions and a recording area of a second recording layer of the same medium into a plurality of second recording regions at substantially the same physical positions as said first recording regions;

a recording control section to control data recording to said data recording medium in such a manner that if one of said first regions targeted to be written with first data for formatting or one of said second regions in substantially the same position as the first region has an unrecorded sector devoid of said first data or of second data designated by a user, then said first data is written to an unrecorded sector in the first region of interest or in the second region which has a same physical position as the first region; said recording control section further controlling the data recording in such a manner that if said first data or said second data is written to said first region or said second region thus eliminating the unrecorded sector from said first or said second region and if an unrecorded sector is detected in said first or said second region different from a respective region from which the unrecorded sector has been eliminated, then said first data is written to the detected unrecorded sector; and a storage device to store information for determining the position to which said second data was last written, wherein, if an unrecorded sector is detected in any one of all said first regions in said first recording layer and in the second region at substantially the same position as the first region of interest in said second layer, then said recording control section controls the data recording to said data recording medium in such a manner that writing of said first data is started with priority by said first data being written to the unrecorded sector in said first or said second region in the recording layer which is different from the recording layer having the region to which said second data was last written as determined by said information.

* * * * *